(12) United States Patent
Uemura et al.

(10) Patent No.: US 12,528,032 B2
(45) Date of Patent: Jan. 20, 2026

(54) MESH FILTER AND FLUID HANDLING DEVICE

(71) Applicant: Enplas Corporation, Saitama (JP)

(72) Inventors: Shigeru Uemura, Saitama (JP); Koji Noguchi, Saitama (JP)

(73) Assignee: Enplas Corporation, Saitama (JP)

( * ) Notice: Subject to any disclaimer, the term of this patent is extended or adjusted under 35 U.S.C. 154(b) by 679 days.

(21) Appl. No.: 17/796,880

(22) PCT Filed: Feb. 2, 2021

(86) PCT No.: PCT/JP2021/003638
§ 371 (c)(1),
(2) Date: Aug. 2, 2022

(87) PCT Pub. No.: WO2021/157547
PCT Pub. Date: Aug. 12, 2021

(65) Prior Publication Data
US 2023/0056206 A1    Feb. 23, 2023

(30) Foreign Application Priority Data
Feb. 3, 2020    (JP) .................................. 2020-016397

(51) Int. Cl.
*B01D 29/01*    (2006.01)
*B01D 39/16*    (2006.01)
*B01L 3/00*    (2006.01)

(52) U.S. Cl.
CPC ............. *B01D 29/01* (2013.01); *B01D 39/16* (2013.01); *B01L 3/527* (2013.01); *B01L 2300/0681* (2013.01)

(58) Field of Classification Search
CPC ........ B01D 29/01; B01D 39/16; B01D 39/10; B01L 3/527; B01L 2300/0681; B01L 2200/12; B01L 3/52; G01N 35/02
See application file for complete search history.

(56) References Cited

U.S. PATENT DOCUMENTS

| | | | |
|---|---|---|---|
| 2005/0112023 A1* | 5/2005 | Liang ............... | G01N 33/54388 422/400 |
| 2019/0151778 A1* | 5/2019 | Okamoto ............ | B29C 45/0025 |
| 2019/0293531 A1 | 9/2019 | Wescott et al. | |
| 2021/0389245 A1* | 12/2021 | Gilboa-Geffen ... | G01N 21/6456 |

FOREIGN PATENT DOCUMENTS

| | | | |
|---|---|---|---|
| JP | 2019-516405 | 6/2019 | |
| WO | WO-2017195774 A1 * | 11/2017 | ......... B01D 39/1692 |
| WO | WO 2017/210552 | 12/2017 | |

* cited by examiner

*Primary Examiner* — Pranav N Patel

(57) ABSTRACT

The present invention provides a mesh filter having superior handling performance for liquid-solution lyophilizates. This mesh filter 130 has a mesh 131, and liquid-solution lyophilizates 132 affixed to the mesh.

7 Claims, 18 Drawing Sheets

MESH FILTER AND FLUID HANDLING DEVICE

TECHNICAL FIELD

The present invention relates to a mesh filter and a fluid handling device including the mesh filter.

BACKGROUND ART

In general, biological materials such as blood, proteins, and DNA are analyzed by mixing with reagents and performing processes such as heating, cooling, and detection. Recently, devices for performing such multiple processes in succession have been known (see, for example, PTL 1).

PTL 1 discloses a disposable cartridge (fluid handling device) having an insert (housing) and a cartridge body (case) that rotatably houses the insert. The insert has a plurality of chambers formed inside. A plurality of through holes corresponding to each chamber are formed in the side wall of the insert. The side wall of the cartridge body has an insertion port into which a syringe can be inserted at a height corresponding to the through holes. Time-stable liquids such as reagents and specimens required for analysis are filled into the chamber in advance.

In the disposable cartridges disclosed in PTL 1, for example, a syringe is inserted through the first through hole corresponding to the first chamber from the insertion port, and the specimen filled in the first chamber is suctioned into the syringe through the first through hole. Next, the insert is rotated circumferentially so that the second through hole corresponding to the second chamber is aligned with the insertion port, and the reagent filled in the second chamber is suctioned into the syringe. This causes the specimen and reagent to be mixed in the syringe. When heating the mixed liquid of specimen and reagent, the mixed liquid in the syringe is discharged into the third chamber for heating, and the third chamber is heated by a heating device or the like.

CITATION LIST

Patent Literature

PTL 1
  Japanese Unexamined Patent Application Publication (Translation of PCT Application) No. 2019-516405

SUMMARY OF INVENTION

Technical Problem

When solutions of reagents that are unstable over time are used, it is necessary to prepare the reagents through before-use preparation. For reagents that requires before-use preparation, lyophilized materials are generally dissolved in a liquid immediately before use, and then used for analysis. It is conceivable to use such lyophilized materials in disposable cartridges as described in PTL 1. In this case, it is conceivable to perform before-use preparation of the reagent by supplying the lyophilized material in a chamber and filling the chamber with liquid. However, in the above method, the lyophilized material may not be placed at the bottom of the chamber due to static electricity in the disposable cartridge body, the lyophilized material may not dissolve, or even if it does dissolve, the efficiency may be reduced due to air bubbles during dissolution. In such cases, the chamber must be filled with a large amount of liquid, which may not result in the desired concentration of the reagent. In addition, the lyophilized reagent is very brittle, making the production and handling of the lyophilized material difficult. In addition, the lyophilized material is produced by dropping it into liquid nitrogen, for example, which is difficult to quantify and carries a high risk of contamination by foreign matter.

An object of the present invention is to provide a mesh filter with excellent handleability of the lyophilized material of solution (reagent). In addition, another object of the present invention is to provide a fluid handling device including the mesh filter.

Solution to Problem

A mesh filter of the embodiment of the present invention includes: a mesh; and a lyophilized material of solution fixed to the mesh.

A fluid handling device of the embodiment of the present invention includes: a case with a bottomed shape; a housing part housed in the case, the housing part being rotatable around a rotation axis with an outer peripheral surface making contact with an inner peripheral surface of the case; and the mesh filter configured to be detachable with respect to the housing part, wherein the housing part includes: a side wall formed in a substantially cylindrical shape, a plurality of chambers formed inside the side wall, and a plurality of communication holes configured to communicate between outside of the side wall and the plurality of chambers.

Advantageous Effects of Invention

The mesh filter of the embodiment of the present invention provides excellent handleability of the lyophilized material of solution. In addition, the liquid handling device including the mesh filter of the embodiment of the present invention can easily dissolve the lyophilized material and can be efficiently used.

DESCRIPTION OF EMBODIMENTS

A fluid handling device according to the present embodiment is described below with reference to the accompanying drawings.

Embodiment 1

Configuration of Fluid Handling Device

Figure 1A:
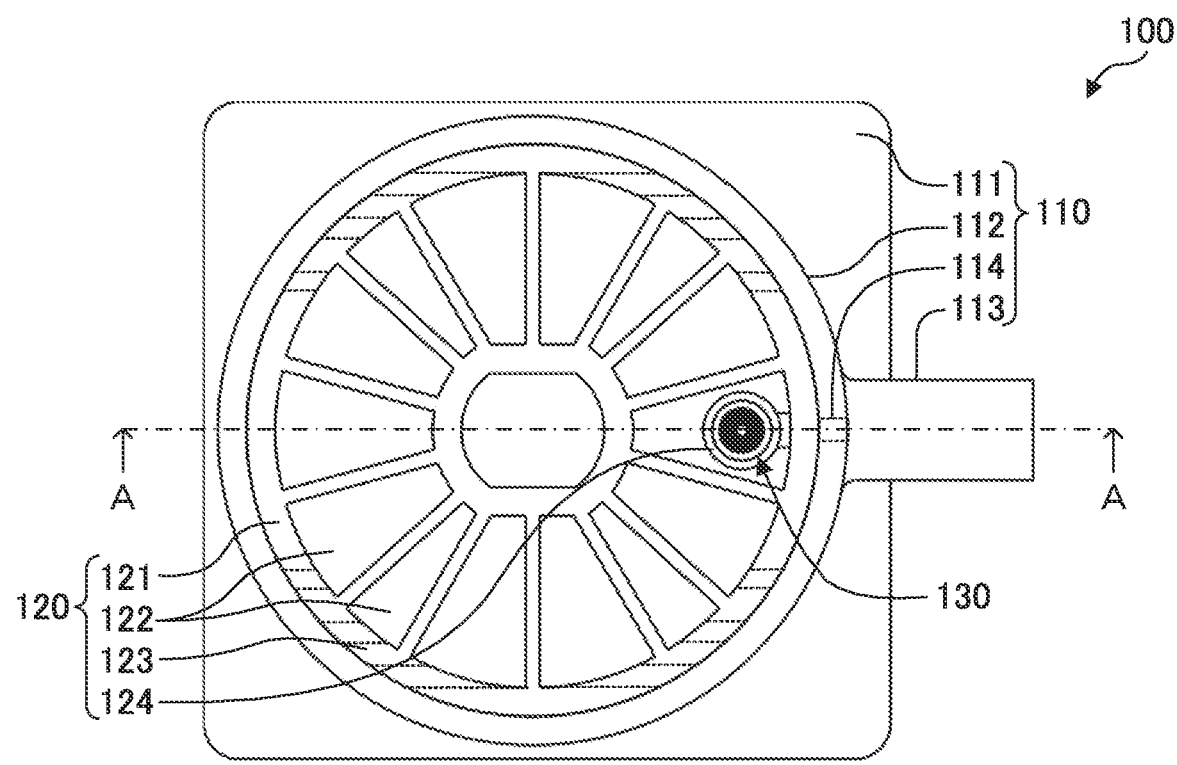
FIGS. 1A and 1B are diagrams illustrating a configuration of a fluid handling device according to Embodiment 1.
Figure 1B:
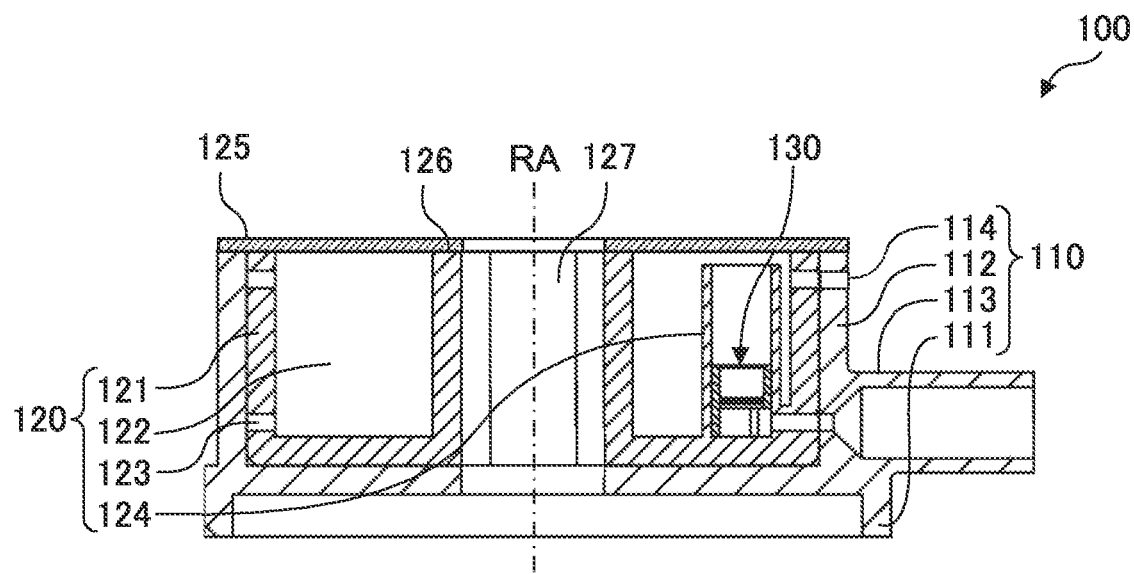

FIGS. 1A and 1B are diagrams illustrating a configuration of fluid handling device 100. FIG. 1A is a plan view of fluid handling device 100, and FIG. 1B is a sectional view taken along line A-A of FIG. 1A.

As illustrated in FIGS. 1A and 1B, fluid handling device 100 includes bottomed case 110, housing part 120, and mesh filter 130. Fluid handling device 100 is used with housing part 120 where mesh filter 130 is fixed is housed in case 110. In this state, at least a part of the outer peripheral surface of housing part 120 is in contact with a part of the inner peripheral surface of case 110. Fluid handling device 100 is used by operating fluid containing gases and liquids (solutions) of reagents and specimens with a syringe not illustrated in the drawings while intermittently rotating housing part 120 around rotation axis RA with respect to case 110 in a sliding contact manner, for the purpose of analyzing objects to be detected in the specimen, for example. The term "solution" here means not only the state in which the solid is dissolved, but also the state in which it is dispersed.

Case 110, housing part 120 and mesh filter 130 are formed as separate members, and fluid handling device 100 is obtained by assembling them. The manufacturing method of case 110, housing part 120 and mesh filter 130 is not limited. Preferably, case 110, housing part 120 and mesh filter 130 (parts other than lyophilized material 132 described later) are manufactured through injection molding using a resin material from a view point of manufacturing cost. The materials of case 110, housing part 120 and mesh filter 130 are not limited as long as they have the resisting property for the reagent used for the analysis and they do not deform at the temperature during the analysis. Examples of the materials of case 110, housing part 120 and mesh filter 130 include polypropylene (PP), thermoplastic polyurethane elastomer (TPU), and polycarbonate (PC).

Figures 2A, 2C:
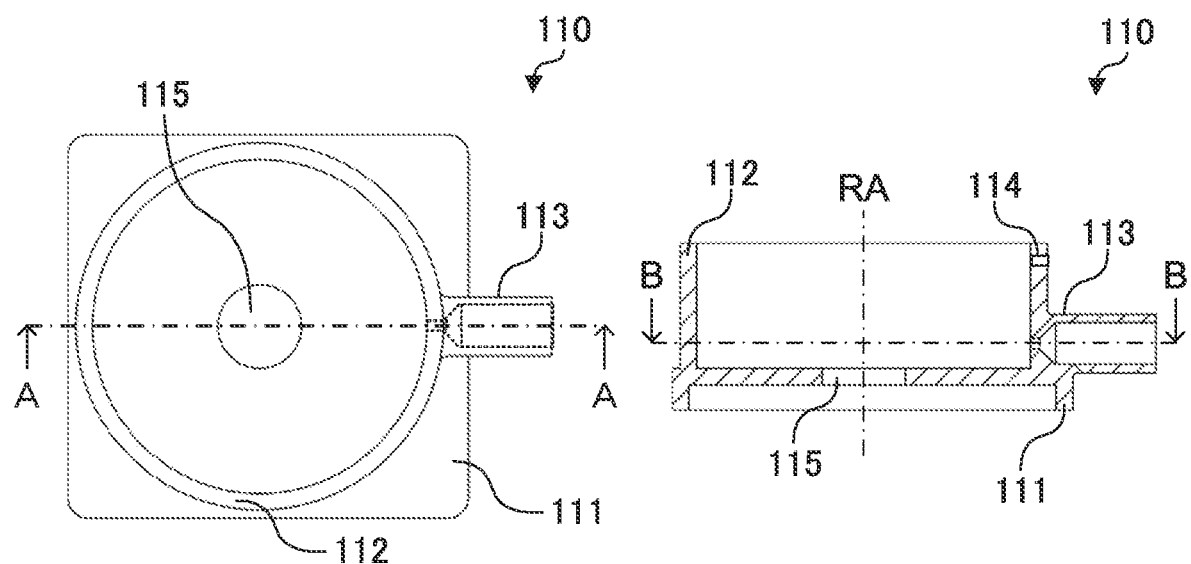
FIGS. 2A to 2D are diagrams illustrating a configuration of a case.
Figures 2B, 2D:
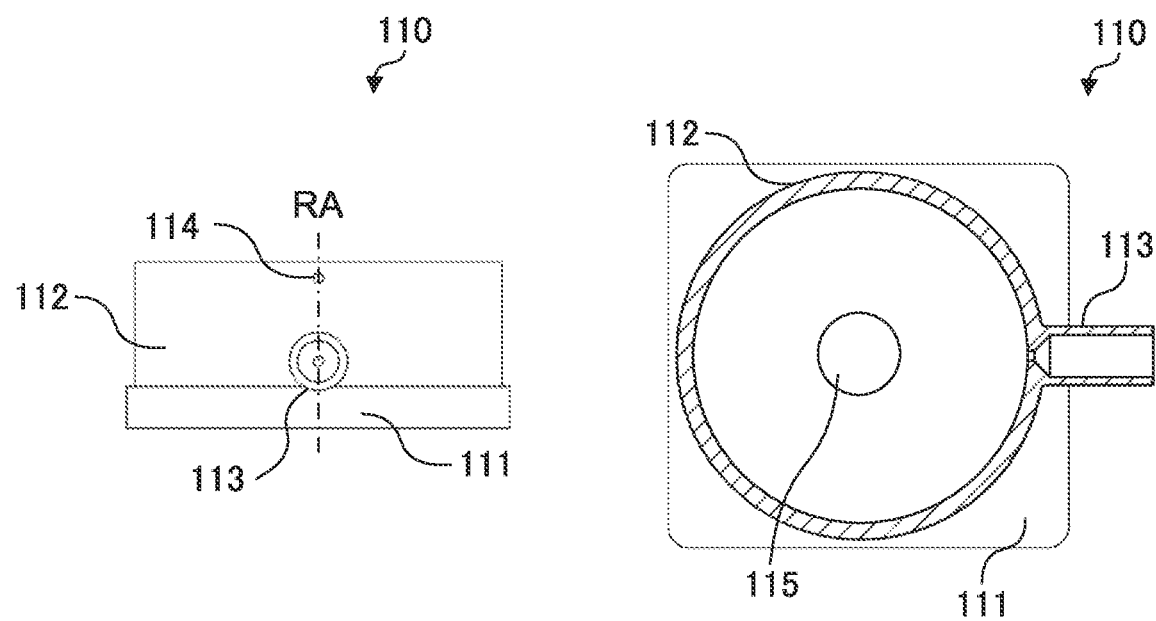

FIGS. 2A to 2D are diagrams illustrating a configuration of case 110. FIG. 2A is a plan view of case 110, FIG. 2B is a right side view, FIG. 2C is a sectional view taken along line A-A of FIG. 2A, and FIG. 2D is a sectional view taken along line B-B of FIG. 2C.

As described above, case 110 houses housing part 120 such that housing part 120 is rotatable about rotation axis RA. As illustrated in FIGS. 2A to 2D, case 110 includes base 111, case body 112, insertion part 113, and outer communication hole 114.

Base 111 functions to install case body 112, and functions also as an installation part for an external device such as a heating cooling device. Case body 112 is fixed at the top surface of base 111. Hole 115 that opens at the front surface and the rear surface of base 111 is formed at a center portion of base 111.

Case body 112 houses housing part 120 such that housing part 120 is rotatable about rotation axis RA. Case body 112 is formed in a cylindrical shape. In case body 112, insertion part 113 for inserting a syringe is disposed, and outer communication hole 114 communicated with second communication hole 142 (described later) of housing part 120 is formed.

Insertion part 113 is formed in a cylindrical shape. Preferably, the shape of the inner surface of insertion part 113 is a shape substantially complementary to the outer shape of the syringe. In the present embodiment, insertion part 113 is configured such that the tip end of the syringe can be inserted to the inner opening of insertion part 113. The shape of the outer opening of insertion part 113 is a shape complementary to the outer shape of the syringe. Insertion part 113 is formed at a position corresponding to first communication hole 141 (described later) formed in housing part 120.

Outer communication hole 114 is formed in case body 112. Outer communication hole 114 is formed at a position corresponding to at least a part of second communication hole 142 (described later) formed in housing part 120. The number of outer communication holes 114 is not limited. One outer communication hole 114 or a plurality of outer communication holes 114 may be provided. In the present embodiment, only one outer communication hole 114 is formed at a height corresponding to a plurality of second communication holes 142 formed in housing part 120.

Figure 3A:
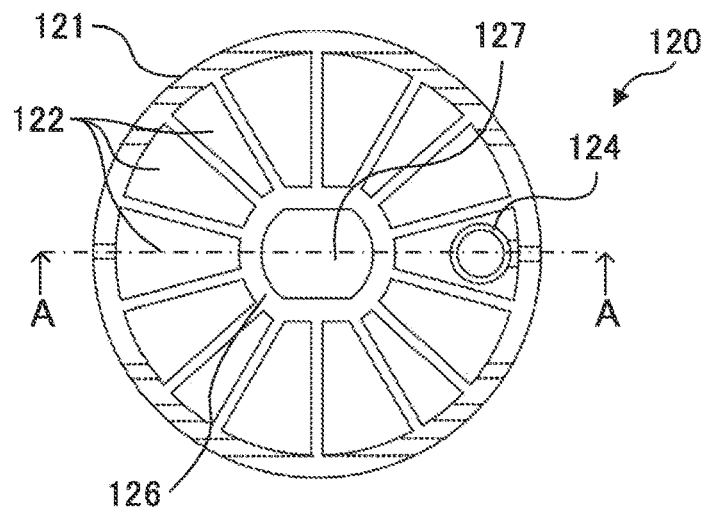
FIGS. 3A to 3C are diagrams illustrating a configuration of a housing part.
Figure 3B:
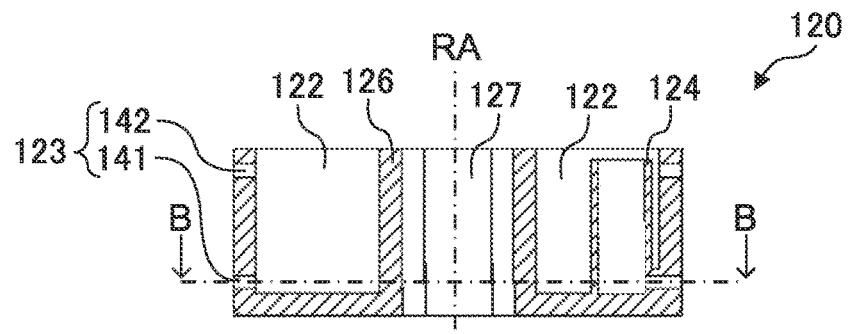
Figure 3C:
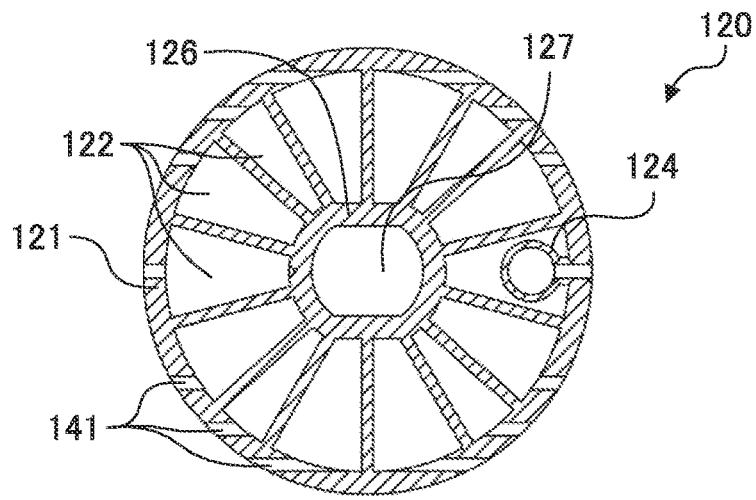

FIGS. 3A to 3C are diagrams illustrating a configuration of housing part 120. FIG. 3A is a plan view of housing part 120, FIG. 3B is a sectional view taken along line A-A of FIG. 3A, and FIG. 3C is a sectional view taken along line B-B of FIG. 3B.

Housing part 120 is housed so as to be rotatable around rotation axis RA while making sliding contact with case 110. Housing part 120 has a substantially cylindrical shape with a closed bottom. In a cross-section along the direction perpendicular to rotation axis RA, the outer shape of housing part 120 is a circular shape.

Housing part 120 includes substantially cylindrical side wall 121, a plurality of chambers 122 formed inside side wall 121, a plurality of communication holes 123 that communicates between the outside of side wall 121 and any of the plurality of chambers 122, fixing part 124 disposed in chamber 122 and configured to fix mesh filter 130, and lid part 125 that closes the opening of chamber 122. The outer shape of housing part 120 is defined by side wall 121. In addition, in housing part 120, the plurality of chambers 122 is defined with inner wall 126, and columnar inner hole 127 is defined with inner wall 126.

Chamber 122 temporarily stores fluid such as liquid (solution) of specimens, reagents or the like and gas, and functions as a reaction vessel for reacting fluid or the like. The number of chambers 122 is not limited. The number of chambers 122 may be appropriately set in accordance with the step required for the analysis. In the present embodiment, fourteen chambers 122 are provided. The size of each chamber 122 is also not limited. The chambers 122 may have the same size or different sizes. In the present embodiment, two chambers 122 facing each other with rotation axis RA therebetween have the same shape. That is, in the present embodiment, the plurality of chambers 122 is formed in a symmetric manner with respect to the cross section including rotation axis RA.

Communication hole 123 is formed in side wall 121. Communication hole 123 connects between the outside of side wall 121 and chamber 122. In the present embodiment, the shape of communication hole 123 is a linear shape. The number of communication holes 123 is not limited. The number of communication holes 123 may be appropriately set in accordance with the specification of fluid handling device 100. Communication hole 123 includes first communication hole 141 and second communication hole 142.

First communication hole 141 is used for input and output of fluid to/from chamber 122. In the present embodiment, a plurality of first communication holes 141 is formed in the lower part of side wall 121. The number of first communication holes 141 is not limited. One first communication hole 141 or a plurality of first communication holes 141 may be provided.

Second communication hole 142 is used as an air hole and the like. In the present embodiment, the plurality of second communication holes 142 is formed in the upper part of side wall 121. The number of second communication holes 142 is the same as the number of chambers 122.

Fixing part 124 fixes mesh filter 130 to a predetermined position, and also functions as chamber 122. More specifically, fixing part 124 fixes mesh filter 130 such that mesh 131 of mesh filter 130 partitions the inner space of chamber 122 where mesh filter 130 is disposed, into the upper space and the lower space. Specifically, mesh filter 130 is disposed in chamber 122 such that, in chamber 122, the fluid on the lower side than mesh 131 cannot move to the upper part than mesh 131 unless it passes through mesh 131, whereas the fluid on the upper side than mesh 131 cannot move to the lower side than mesh 131 unless it passes through mesh 131. The shape of fixing part 124 is not limited as long as the above-mentioned function can be ensured. Fixing part 124 is formed in a cylindrical shape. In the cross-section along the direction orthogonal to rotation axis RA, the shape of the inner peripheral surface of fixing part 124 is complementary to the outer shape of mesh filter 130. In the present embodiment, the shape of the inner peripheral surface of fixing part 124 in that cross-section is a circular shape that is slightly smaller than the outer shape of mesh filter 130. In this manner, when mesh filter 130 is disposed at fixing part 124, mesh filter 130 and fixing part 124 are maintained in a liquid-tight (air-tight) state. In addition, in the present embodiment, fixing part 124 is disposed in contact with the bottom surface. The side wall of fixing part 124 (chamber 122) is connected to the inner opening of insertion part 113 through the passage. In this manner, the fluid entered from insertion part 113 fills the interior of chamber 122.

Figure 4A:
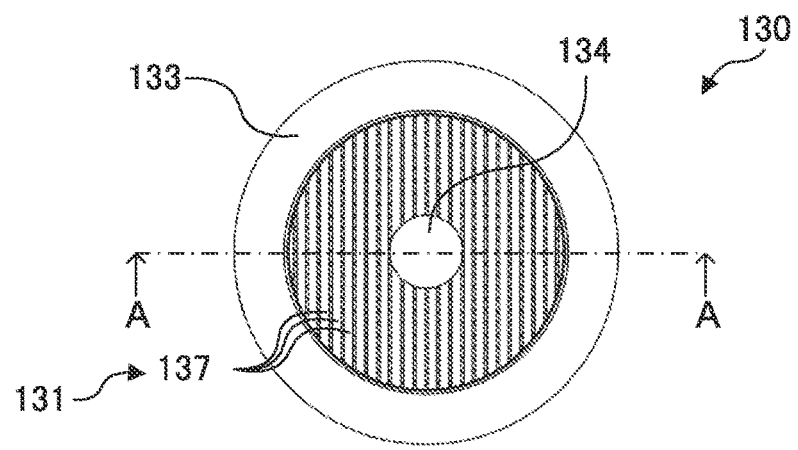
FIGS. 4A to 4C are diagrams illustrating a configuration of a mesh filter.
Figure 4B:
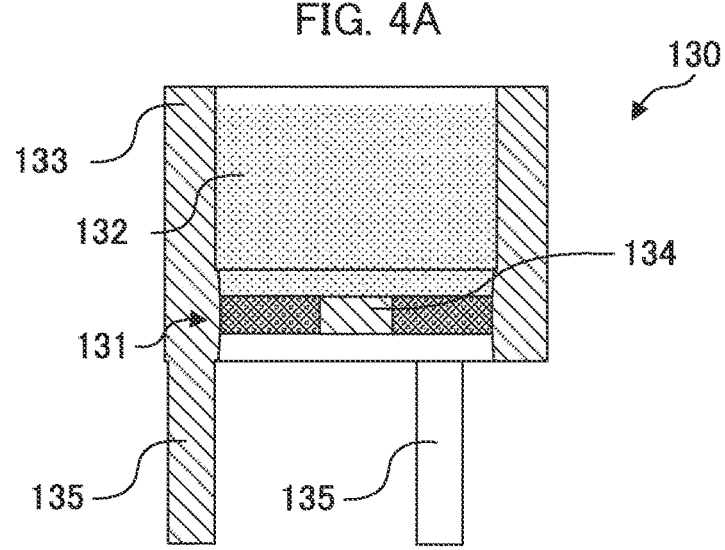
Figure 4C:
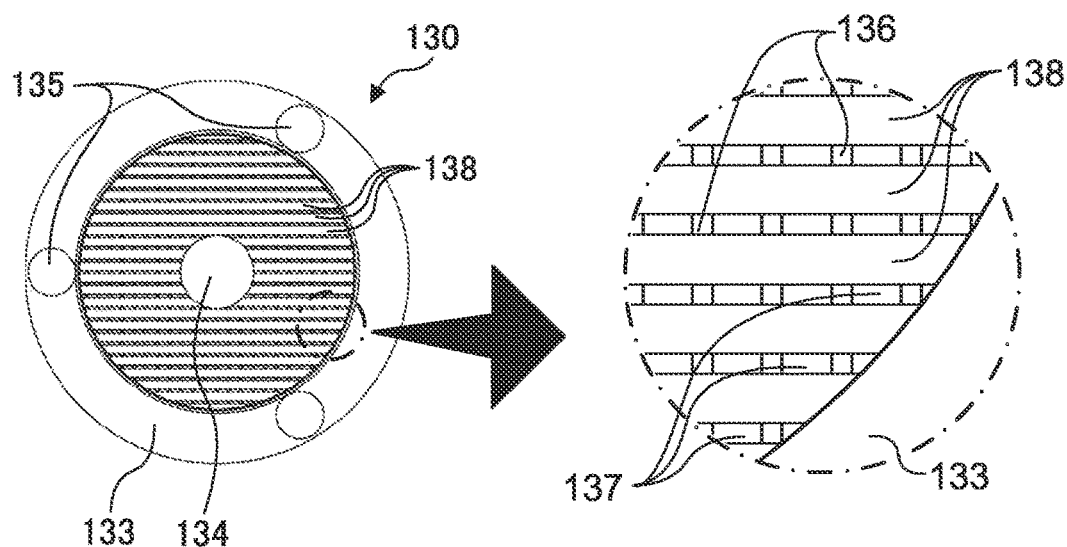

FIGS. 4A to 4C are diagrams illustrating a configuration of mesh filter 130. FIG. 4A is a plan view of mesh filter 130, FIG. 4B is a sectional view taken along line A-A of FIG. 4A, and FIG. 4C is a bottom view and a partially enlarged view of the region indicated with the dashed line. Note that in FIG. 4A, lyophilized material 132 is omitted. In addition, in FIG. 4B, mesh 131 (first rib 137 and second rib 138) is shaded.

As illustrated in FIGS. 4A to 4C, mesh filter 130 includes mesh 131 and solution lyophilized material 132, and functions as a solution holding part. Mesh filter 130 may include rim 133, final charging part 134 and leg part 135. In the present embodiment, mesh filter 130 further includes rim 133, final charging part 134 and leg part 135.

The material of mesh 131 may be a resin such as polypropylene (PP), polyacetal (POM) and polyamide (PA), or a metal such as stainless-steel, titanium and aluminum. In addition, mesh 131 may be a non-woven fabric, paper, or cloth. In the present embodiment, mesh 131 is made of resin, and is integrally shaped by injection molding.

Solution lyophilized material 132 is firmly fixed to mesh 131. When liquid passes through mesh 131, lyophilized material 132 is dissolved in the liquid. Mesh 131 is fixed to fixing part 124 so as to be located on the bottom side of chamber 122. In mesh 131, a plurality of ribs (first rib 137 and second rib 138) is disposed in a grid pattern. The shape of mesh 131 in plan view is not limited. In the present embodiment, the shape in plan view of mesh 131 is a circular shape. A plurality of holes 136 is formed in mesh 131. The shape in plan view of the plurality of holes 136 in mesh 131 is not limited. The shape in plan view of hole 136 may be a circular shape or a polygonal shape. In the present embodiment, mesh 131 includes a plurality of first ribs 137 and a plurality of second ribs 138. With the plurality of first ribs 137 and the plurality of second ribs 138, the plurality of holes 136 whose shape in plan view is square is formed. The length of each side of hole 136 is appropriately set in accordance with the viscosity of the solution, the type of the solution and the like. Preferably, the length of each side of hole 136 (the mesh opening of mesh 131) is 0.1 μm to 500 μm, more preferably 0.2 to 300 μm. With the length of each side of hole 136 (the mesh opening of mesh 131) within the above-mentioned range, it is easily manufactured, and passing of the solution through mesh 131 due to the surface tension does not occur. That is, the solution can be held on mesh 131. Also in this state, by applying a force to the solution, it can pass through mesh 131. In the present embodiment, mesh 131 is made of resin, and therefore, preferably, the mesh opening of mesh 131 is 10 to 500 μm, or more preferably 20 to 300 μm. The number of holes 136 is not limited. For example, the number of holes 136 is 1 to 400/mm$^2$.

First rib 137 is a ridge extending in the first direction. The plurality of first ribs 137 is disposed parallel to each other at even intervals in the second direction orthogonal to the first direction. In the present embodiment, the plurality of first ribs 137 is disposed on a first surface (front side surface) of a virtual plane. The shape of first rib 137 in the cross-section orthogonal to the extending direction is not limited. In the present embodiment, the cross-sectional shape is a substantially triangular shape with one arc-shaped apex.

As described later, final charging part 134 is disposed at a center portion of mesh 131. Thus, regarding first rib 137 passing through the center portion of mesh 131, one end is connected to the inner peripheral surface of rim 133, and the other end is connected to the side surface of final charging part 134. Regarding first rib 137 that does not pass through the center portion of mesh 131, both ends are connected to the inner peripheral surface of rim 133.

Second rib 138 is a ridge extending in the second direction. The plurality of second ribs 138 is disposed parallel to each other at even intervals in the first direction. In the present embodiment, the plurality of second ribs 138 is disposed on a second surface (rear side surface) of a virtual plane. The shape of second rib 138 in the cross-section orthogonal to the extending direction is not limited. In the present embodiment, the cross-sectional shape is a substantially triangular shape with one arc-shaped apex.

As with first rib 137, regarding second rib 138 passing through the center portion of mesh 131, one end is connected to the inner peripheral surface of rim 133, and the other end is connected to the side surface of final charging part 134. Regarding second regarding rib 138 that does not pass through the center portion of mesh 131, both ends are connected to the inner peripheral surface of rim 133.

The plurality of first ribs 137 and the plurality of second ribs 138 are disposed in a front-rear relationship with respect to the virtual plane. That is, the plurality of first ribs 137 and the plurality of second ribs 138 are disposed at different positions in the height direction of the rib. In plan view of mesh 131, the plurality of second ribs 138 is disposed at even intervals in the first direction on the depth side of first rib 137. In addition, in bottom view of mesh 131, the plurality of first ribs 137 is disposed at even intervals in the second direction on the depth side of second rib 138.

Lyophilized material 132 is firmly fixed to mesh 131. Lyophilized material 132 is a lyophilized material of various solutions used for fluid handling device 100. Lyophilized material 132 may be firmly fixed to the upper side (front side) of mesh 131, firmly fixed to the lower side (rear side, leg part 135 side), or firmly fixed to the upper part side and the lower side. In the present embodiment, lyophilized material 132 is firmly fixed to the upper side of mesh 131. The manufacturing method of lyophilized material 132 firmly fixed to mesh 131 will be described later.

Rim 133 holds mesh 131. Rim 133 is disposed to surround mesh 131. The shape in plan view of rim 133 is not limited. The shape in plan view of rim 133 may be a polygonal shape, an elliptical shape or a circular shape. In the present embodiment, the shape in plan view of rim 133 is an annular shape. The plurality of first ribs 137 and the plurality of second ribs 138 are connected to the inner peripheral surface of rim 133. Preferably, the height of rim 133 from mesh 131 is greater than the thickness of solution lyophilized material 132. In this manner, the handleability of lyophilized material can be increased.

Final charging part 134 is disposed at the center portion of mesh 131 in rim 133. Final charging part 134 is surrounded by mesh 131. Final charging part 134 is a portion that is finally filled with molten resin at the time of injection molding. Final charging part 134 may function as a degassing part when supplying molten resin into the cavity, and may function as a portion where the ejector pin makes contact at the time of releasing the injection molding member. The shape of final charging part 134 is not limited as long as the above-mentioned function can be ensured. In the present embodiment, final charging part 134 has a columnar shape. The side surface of final charging part 134 is connected to some first ribs 137 of the plurality of first ribs 137 and some second ribs 138 of the plurality of second ribs 138.

Leg part 135 is disposed along the circumferential direction of the rear surface of rim 133 at even intervals. The number of leg parts 135 is not limited. In the present embodiment, three leg parts 135 are provided. With leg parts 135 disposed in contact with the bottom of chamber 122, mesh filter 130 is fixed to fixing part 124 at a constant height.

Lid part 125 closes at least a part of the opening of each chamber 122. The material of lid part 125 is not limited as long as the opening of chamber 122 can be closed and the solution in chamber 122 may be appropriately stored. Preferably, lid part 125 has a film shape from a view point of weldability and cost. Examples of the material of lid part 125 include PP, PC, polyethylene terephthalate (PET), and aluminum. Preferably, lid part 125 is a PP film from a view point of weldability and the like.

Here, a manufacturing method of solution lyophilized material 132 firmly fixed to mesh 131 is described. Solution lyophilized material 132 can be produced by freezing the solution placed on mesh 131 and then dehydrating it by reduced pressure. First, the solution is supplied to mesh 131. At this time, with the surface tension of the solution, the solution does not pass through mesh 131. The amount of the solution to be supplied is appropriately set in accordance with the type of the analysis using fluid handling device 100. Next, mesh 131 to which the solution has been supplied is frozen with the entire mesh 131. The method of freezing is not limited. Examples of the method of freezing the solution include a method using liquid nitrogen, or a method using a freezer. Finally, lyophilized material 132 can be obtained by sublimating the liquid components in the solution by reducing the pressure.

Figure 5A:
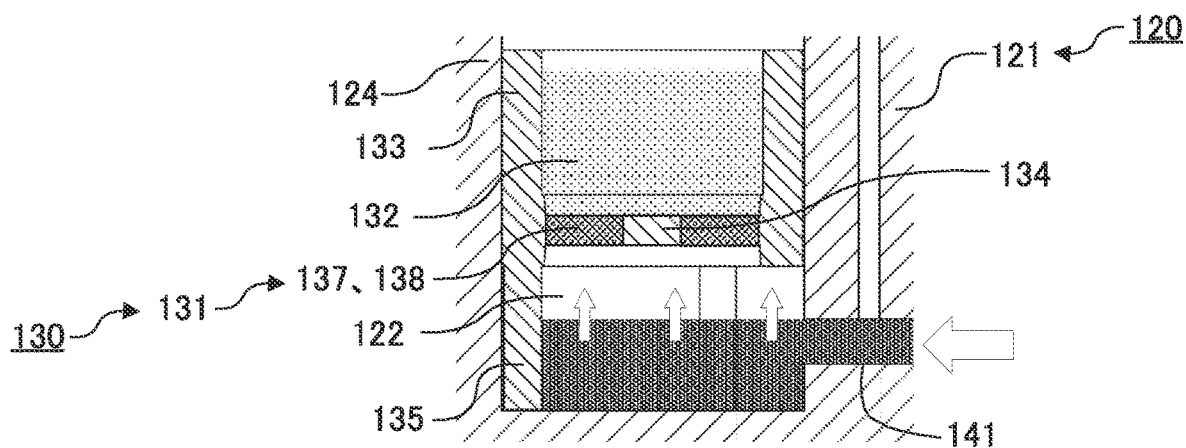
FIGS. 5A to 5C are diagrams for describing a dissolving method of a lyophilized material.
Figure 5B:
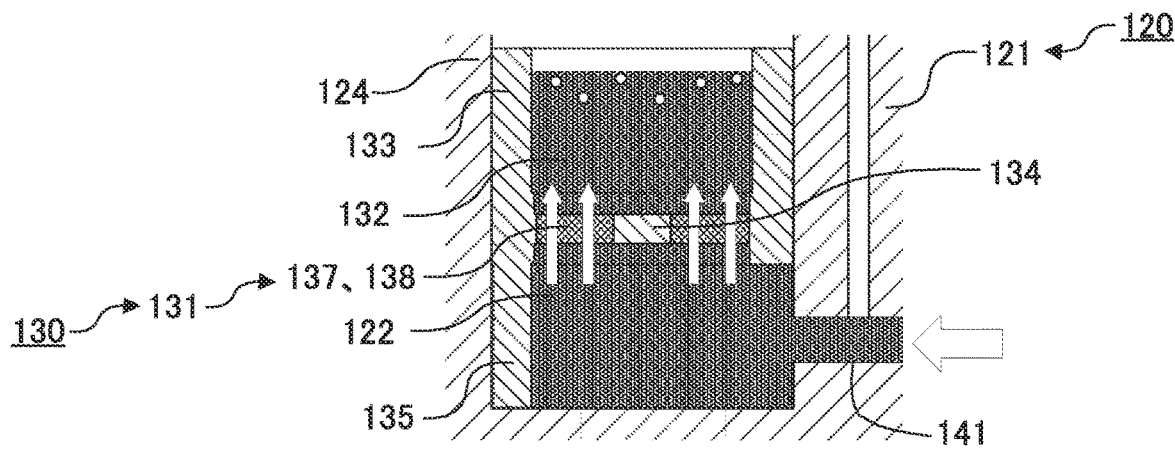
Figure 5C:
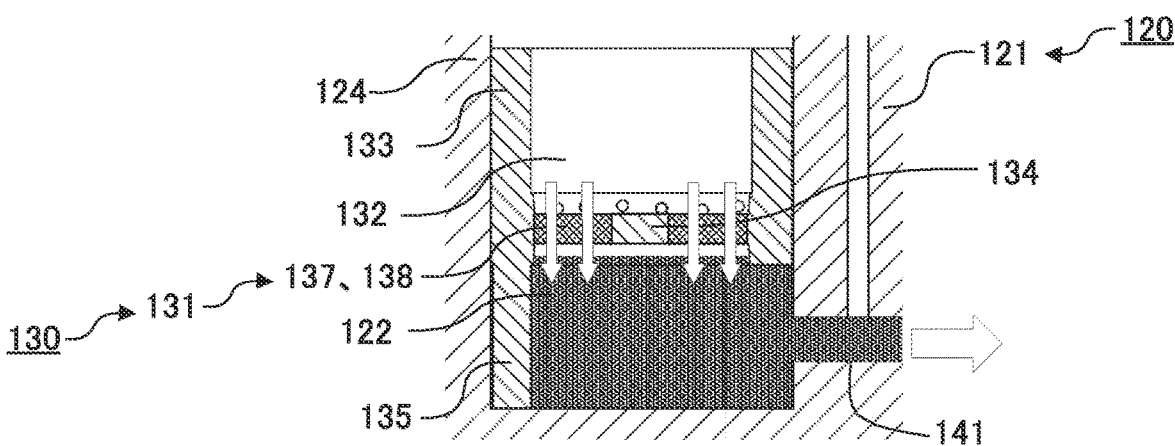

Next, a before-use preparation method of solution (dissolving method of lyophilized material 132) is described. FIGS. 5A to 5C are diagrams for describing a dissolving method of lyophilized material 132.

In fluid handling device 100, a syringe is inserted into insertion part 113 and the liquid for dissolving lyophilized material 132 stored in chamber 122 is suctioned through first communication hole 141. At this time, second communication hole 142 functions as an air hole.

As illustrated in FIG. 5A, housing part 120 in case 110 is rotated around rotation axis RA, chamber 122 where mesh filter 130 is disposed is aligned with first communication hole 141. Then, the liquid in the syringe is ejected into chamber 122. In this manner, in fluid handling device 100, second communication hole 142 functions as an air hole at the time of inputting and outputting the liquid to/from chamber 122.

As illustrated in FIG. 5B, the liquid in the syringe is gradually supplied from the bottom of fixing part 124. The liquid supplied up to the height of mesh 131 passes through hole 136 of mesh 131 and makes contact with lyophilized material 132. The liquid in contact with lyophilized material 132 becomes a solution as lyophilized material 132 dissolves. At this time, lyophilized material 132 is firmly fixed to mesh 131, and is thus reliably dissolved without floating at the liquid surface of the liquid. Note that when lyophilized material 132 is difficult to dissolve in the liquid, it is preferable that lyophilized material 132 be dissolved by moving the liquid by the inputting and outputting the liquid to/from chamber 122 with the syringe. At this time, in the case where surfactant is contained in lyophilized material 132 or the liquid, bubbles may be generated.

As illustrated in FIG. 5C, the solution is suctioned with the syringe. At this time, even when bubbles are generated, the bubbles can be removed at mesh 131, and thus mixing of the bubbles into the solution in the syringe can be prevented. In this manner, before-use preparation of the solution can be achieved.

Effect

As described above, in the present invention, lyophilized material 132 is firmly fixed to mesh 131, and thus before-use preparation of the solution can be achieved by appropriately dissolving lyophilized material 132 in the liquid.

Modifications 1 to 8

Next, fluid handling devices according to Modifications 1 to 8 are described. The fluid handling devices according to Modifications 1 to 8 are different from fluid handling device 100 according to Embodiment 1 only in configuration of the mesh filter. In view of this, only the configuration of the mesh filter will be described. In addition, the components similar to those of mesh filter 130 of Embodiment 1 are denoted with the same reference numerals and the description thereof will be omitted.

Figure 6A:
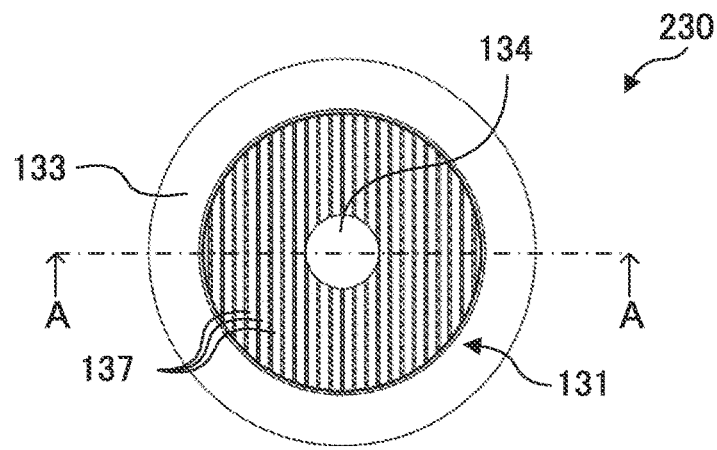
FIGS. 6A to 6C are diagrams illustrating a configuration of a mesh filter according to Modification 1.
Figure 6B:
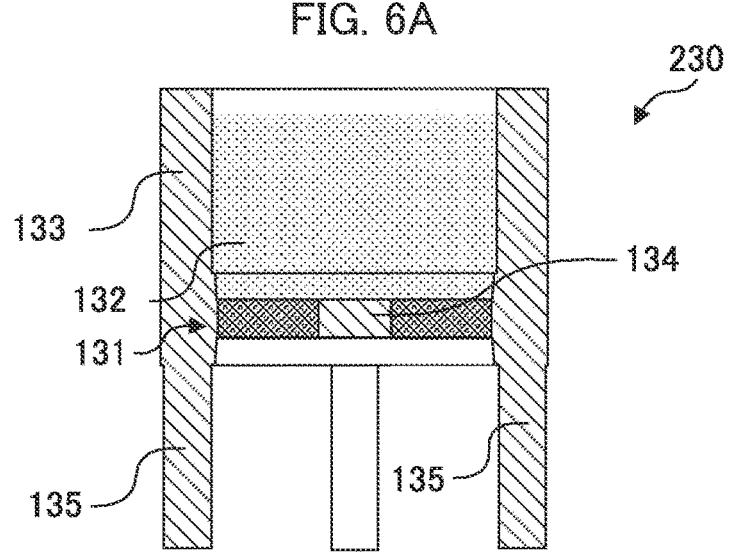
Figure 6C:
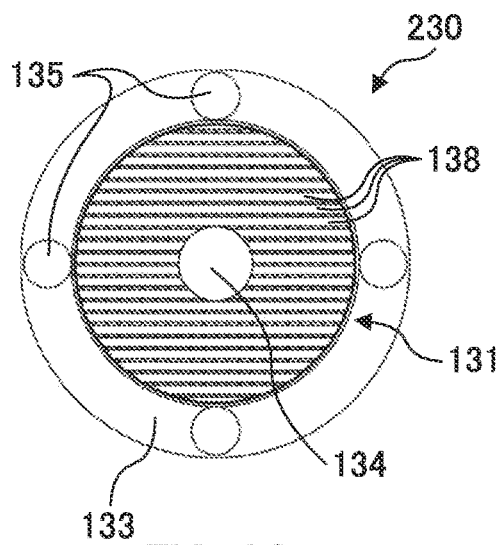

FIGS. 6A to 6C are diagrams illustrating a configuration of mesh filter 230 according to Modification 1. FIG. 6A is a plan view of mesh filter 230 according to Modification 1, FIG. 6B is a sectional view taken along line A-A of FIG. 6A, and FIG. 6C is a bottom view. In FIG. 6A, lyophilized material 132 is omitted. In addition, in FIG. 6B, mesh 131 (first rib 137 and second rib 138) is shaded.

As illustrated in FIGS. 6A to 6C, mesh filter 230 according to Modification 1 includes four leg parts 135. Leg parts 135 are disposed along the circumferential direction of the rear surface of rim 133 at even intervals.

Figure 7A:
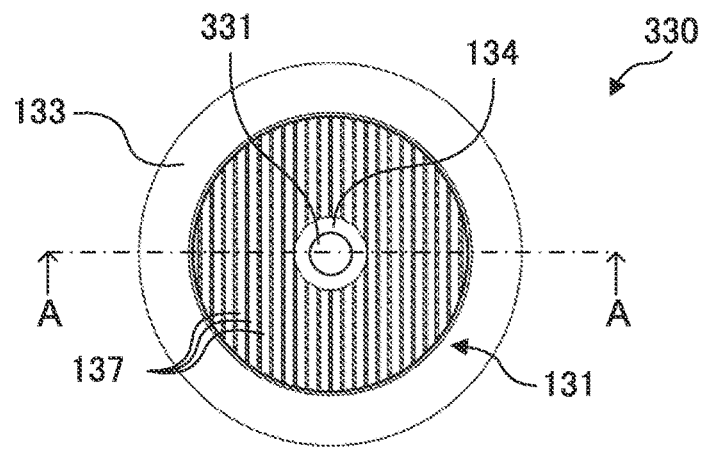
FIGS. 7A to 7C are diagrams illustrating a configuration of a mesh filter according to Modification 2.
Figure 7B:
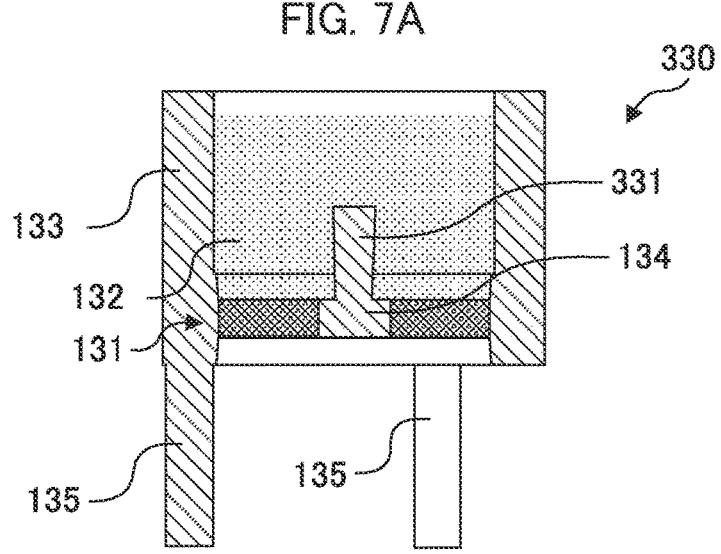
Figure 7C:
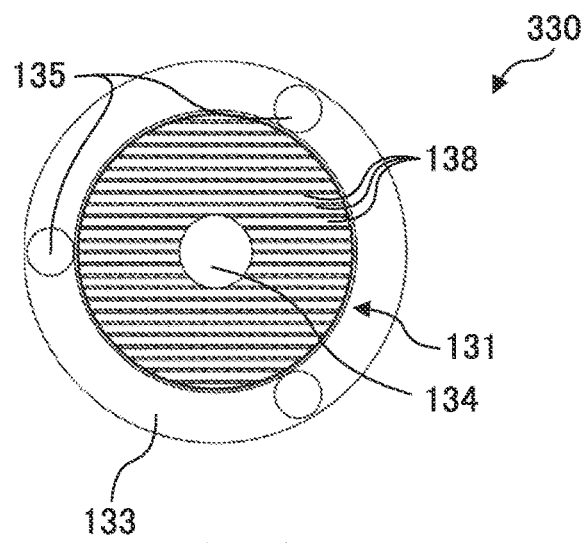

FIGS. 7A to 7C are diagrams illustrating a configuration of mesh filter 330 according to Modification 2. FIG. 7A is a plan view of mesh filter 330 according to Modification 2, FIG. 7B is a sectional view taken along line A-A of FIG. 7A, and FIG. 7C is a bottom view. In FIG. 7A, lyophilized material 132 is omitted. In addition, in FIG. 7B, mesh 131 (first rib 137 and second rib 138) is shaded.

As illustrated in FIGS. 7A to 7C, mesh filter 330 according to Modification 2 includes protrusion 331 at final charging part 134. Protrusion 331 prevents lyophilized material 132 from being separated from mesh 131. The shape of protrusion 331 is not limited as long as the above-mentioned function can be ensured. In the present embodiment, protrusion 331 is formed to extend toward the opening of rim 133 in the direction along rotation axis RA (the vertical direction in the drawing). In addition, protrusion 331 is formed such that the cross-sectional area increases as the distance from final charging part 134 and the mesh increases.

Figure 8A:
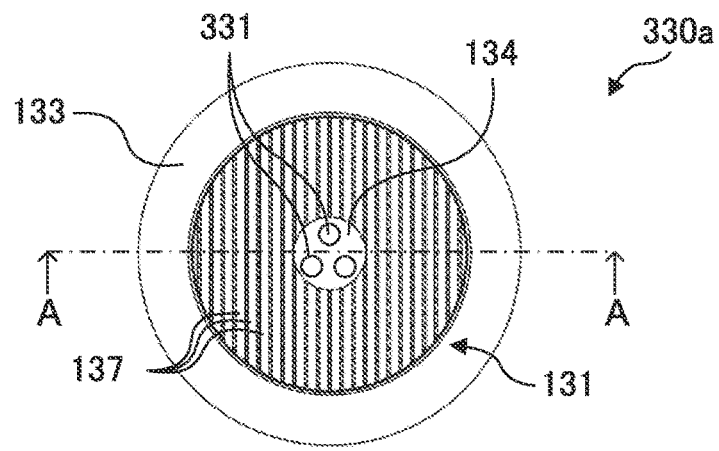
FIGS. 8A to 8C are diagrams illustrating a configuration of a mesh filter according to Modification 3.
Figure 8B:
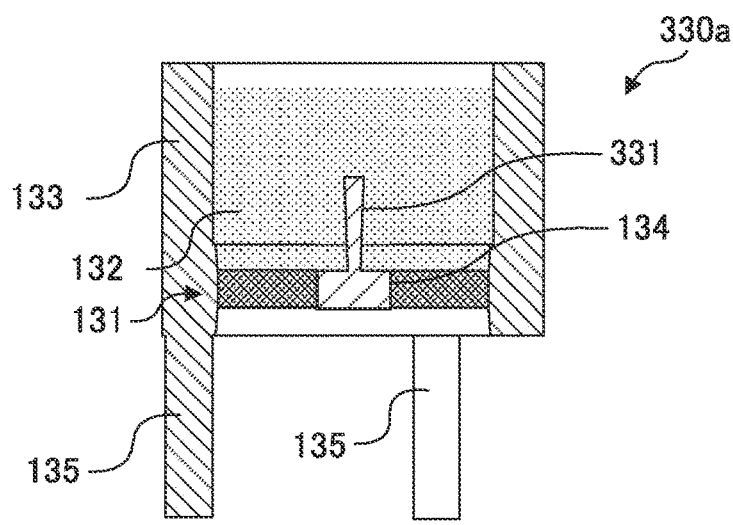
Figure 8C:
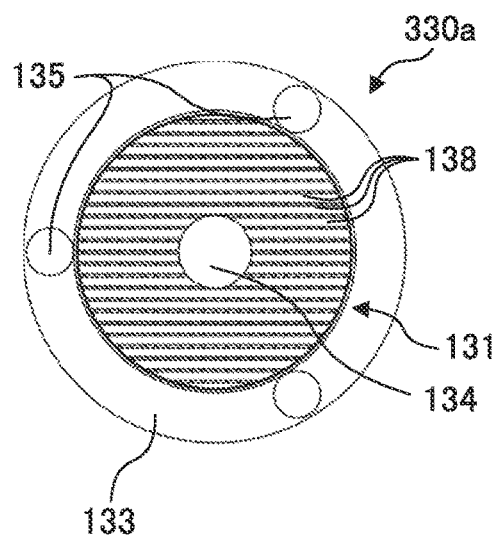

FIGS. 8A to 8C are diagrams illustrating a configuration of mesh filter 330a according to Modification 3. FIG. 8A is a plan view of mesh filter 330a according to Modification 3, FIG. 8B is a sectional view taken along line A-A of FIG. 8A, and FIG. 8C is a bottom view. In FIG. 8A, lyophilized material 132 is omitted. In addition, in FIG. 8B, mesh 131 (first rib 137 and second rib 138) is shaded.

As illustrated in FIGS. 8A to 8C, mesh filter 330a according to Modification 3 includes a plurality of protrusions 331 at final charging part 134. The plurality of protrusions 331 protrudes toward the front side of the rim, and is disposed at final charging part 134. The number of protrusions 331 is not limited as long as a plurality of protrusions 331 is provided. In the present modification, three protrusions 331 are provided. The plurality of protrusions 331 is disposed in the circumferential direction. Protrusion 331 is formed toward the opening of rim 133 in the direction along rotation axis RA (the vertical direction in the drawing). In addition, protrusion 331 is formed such that the cross-sectional area increases as the distance from final charging part 134 and the mesh increases. Mesh filter 330a of the present modification can more effectively prevent lyophilized material 132 from being separated than mesh filter 330 according to Modification 2.

Figure 9A:
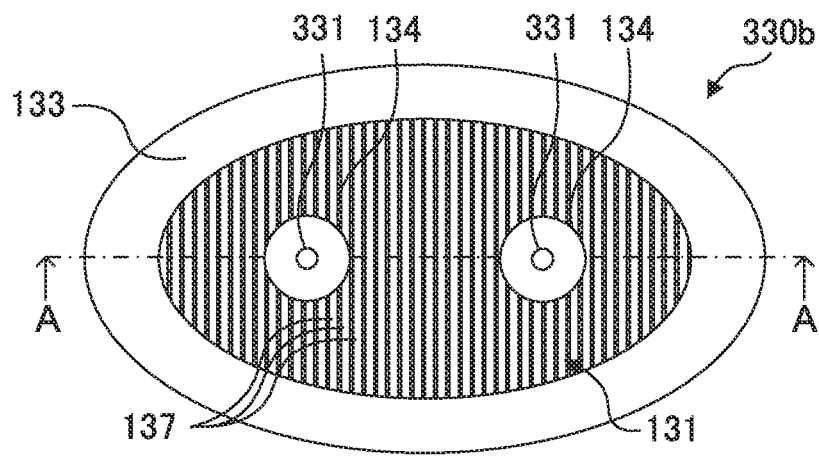
FIGS. 9A to 9C are diagrams illustrating a configuration of a mesh filter according to Modification 4.
Figure 9B:
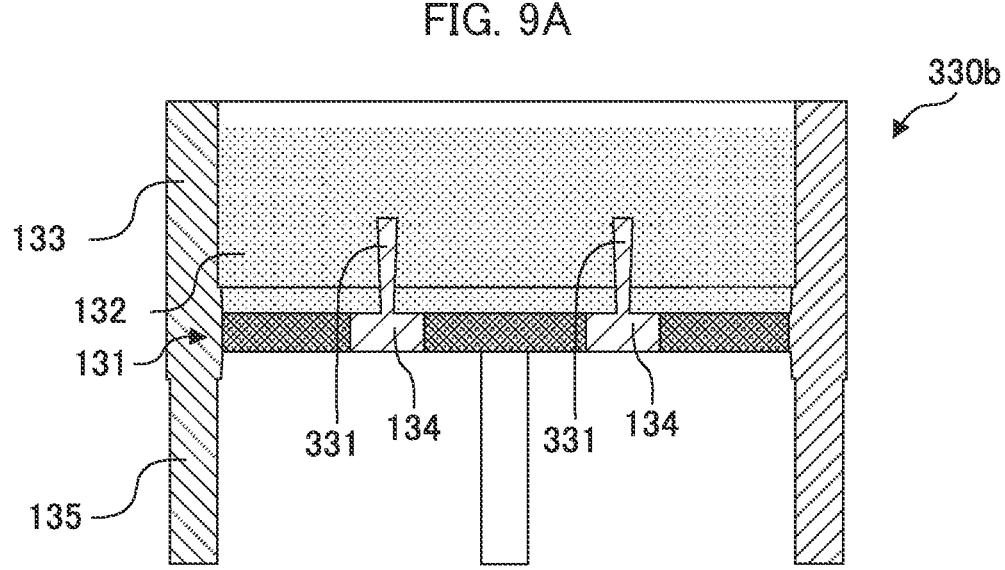
Figure 9C:
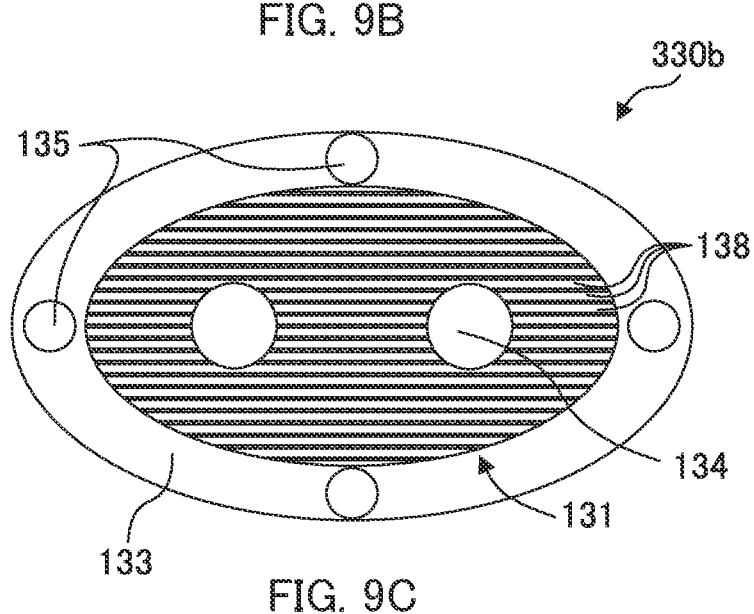

FIGS. 9A to 9C are diagrams illustrating a configuration of mesh filter 330b according to Modification 4. FIG. 9A is a plan view of mesh filter 330b according to Modification 4, FIG. 9B is a sectional view taken along line A-A of FIG. 9A, and FIG. 9C is a bottom view. In FIG. 9A, lyophilized material 132 is omitted. In addition, in FIG. 9B, mesh 131 (first rib 137 and second rib 138) is shaded.

As illustrated in FIGS. 9A to 9C, mesh filter 330b according to Modification 4 includes a plurality of final charging parts 134. Protrusion 331 protrudes toward the front side of the rim, and is disposed at final charging part 134. In the present modification, one protrusion 331 is provided for each final charging part 134. In addition, protrusion 331 is formed such that the cross-sectional area increases as the distance from final charging part 134 and the mesh increases. Further, the shape in plan view of mesh filter 330b of the present modification is an elliptical shape. Mesh filter 330b of the present modification can more effectively prevent lyophilized material 132 from being separated than mesh filter 330 according to Modification 2.

Figure 10A:
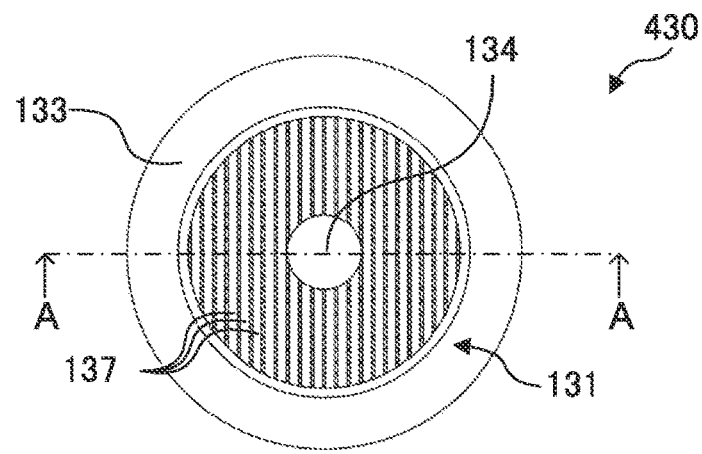
FIGS. 10A to 10C are diagrams illustrating a configuration of a mesh filter according to Modification 5.
Figure 10B:
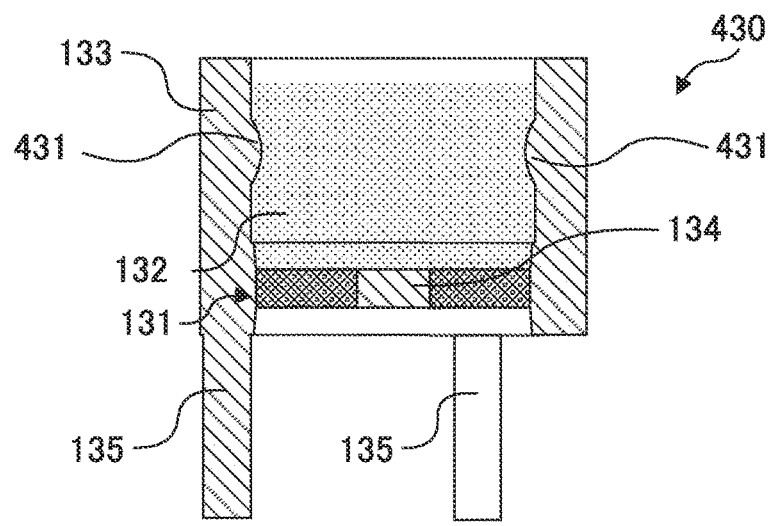
Figure 10C:
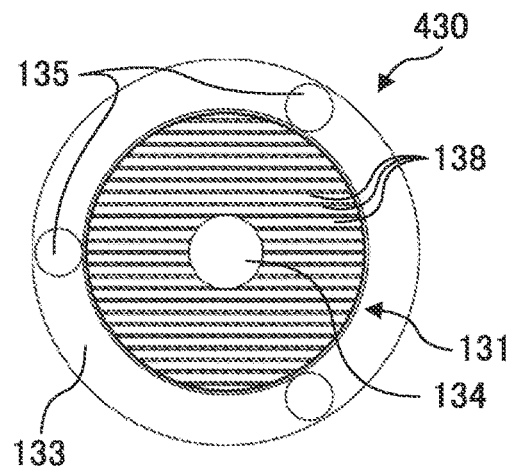

FIGS. 10A to 10C are diagrams illustrating a configuration of mesh filter 430 according to Modification 5. FIG. 10A is a plan view of mesh filter 430 according to Modification 5, FIG. 10B is a sectional view taken along line A-A of FIG. 10A, and FIG. 10C is a bottom view. In FIG. 10A, lyophilized material 132 is omitted. In addition, in FIG. 10B, mesh 131 (first rib 137 and second rib 138) is shaded.

As illustrated in FIGS. 10A to 10C, mesh filter 430 according to Modification 5 includes first protrusion 431 at the inner peripheral surface of rim 133. First protrusion 431 prevents lyophilized material 132 from being separated from mesh 131. The shape of first protrusion 431 is not limited as long as the above-mentioned function can be ensured. In the present embodiment, first protrusion 431 is a protrusion formed along the circumferential direction at the inner peripheral surface of rim 133. The shape of first protrusion 431 in the cross section including rotation axis RA is an arch shape.

Figure 11A:
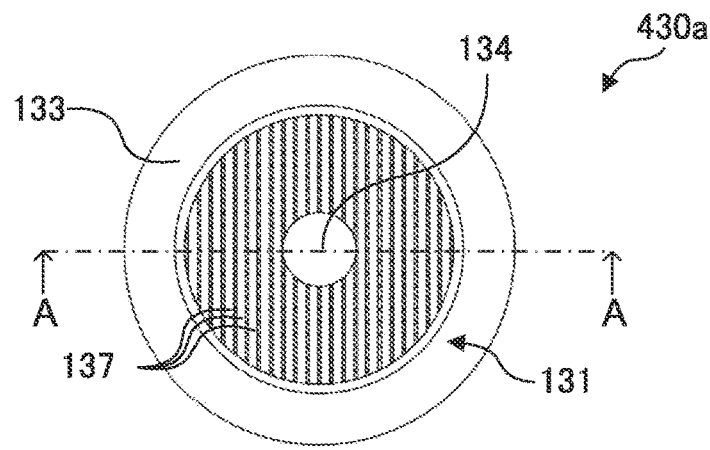
FIGS. 11A to 11C are diagrams illustrating a configuration of a mesh filter according to Modification 6.
Figure 11B:
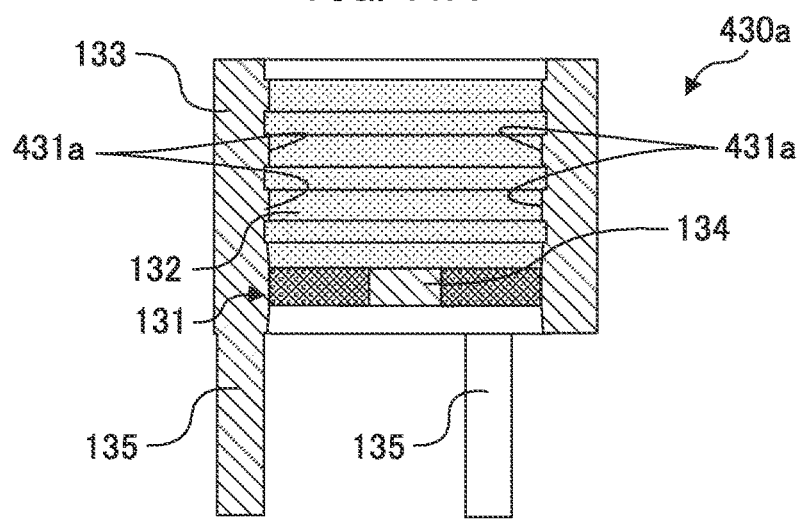
Figure 11C:
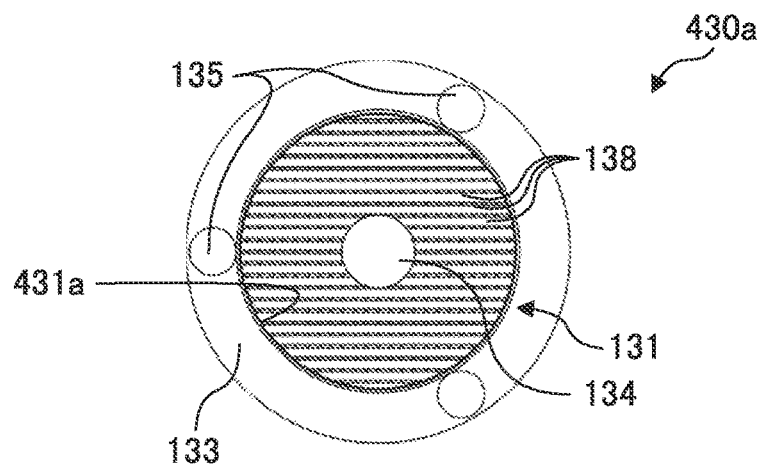

FIGS. 11A to 11C are diagrams illustrating a configuration of mesh filter 430a according to Modification 6. FIG. 11A is a plan view of mesh filter 430a according to Modification 6, FIG. 11B is a sectional view taken along line A-A of FIG. 11A, and FIG. 11C is a bottom view. In FIG. 11A, lyophilized material 132 is omitted.

As illustrated in FIGS. 11A to 11C, mesh filter 430a according to Modification 6 includes a plurality of second protrusions 431a at the inner peripheral surface of rim 133. Second protrusion 431a is a protrusion formed along the circumferential direction at the inner peripheral surface of rim 133. In the present modification, a plurality of second protrusions 431a are provided, and therefore the inner peripheral surface of rim 133 has a shape in which recesses and protrusions alternate in the direction along rotation axis RA (the vertical direction in the drawing). The shape of second protrusion 431a in the cross-section taken along line A-A of FIG. 11A is a rectangular shape. In other words, in the present modification, the inner peripheral surface of rim 133 includes a plurality of undercuts. In this manner, the inner peripheral surface of rim 133 includes the plurality of second protrusions 431a (undercuts), and thus lyophilized material 132 is prevented from being separated from mesh 131.

Figure 12A:
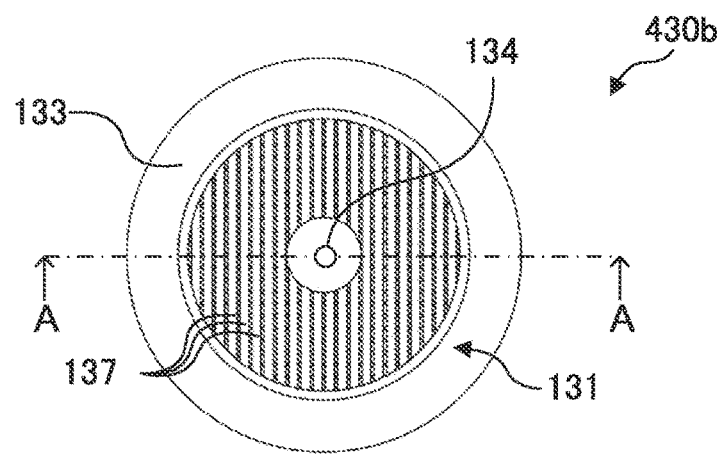
FIGS. 12A to 12C are diagrams illustrating a configuration of a mesh filter according to Modification 7.
Figure 12B:
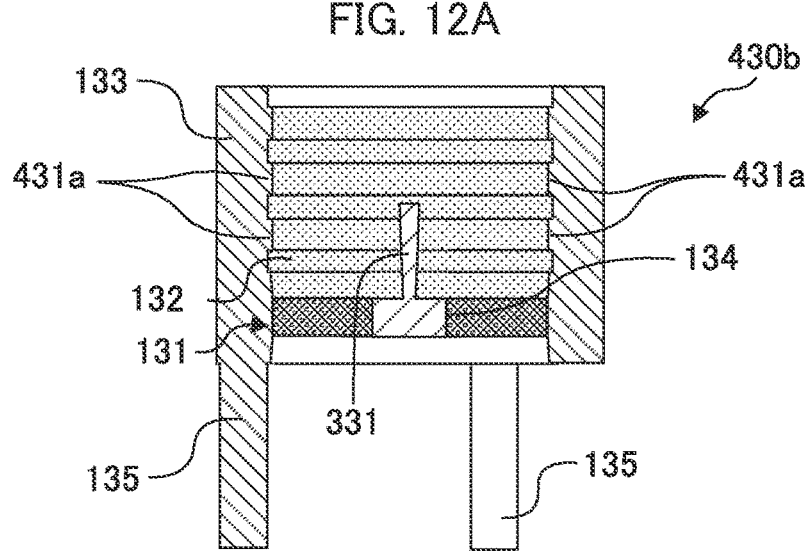
Figure 12C:
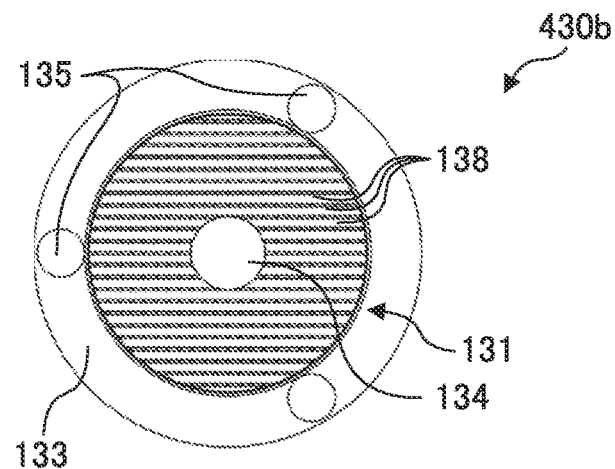

FIGS. 12A to 12C are diagrams illustrating a configuration of mesh filter 430b according to Modification 7. FIG. 12A is a plan view of mesh filter 430b according to Modification 7, FIG. 12B is a sectional view taken along line A-A of FIG. 12A, and FIG. 12C is a bottom view. In FIG. 12A, lyophilized material 132 is omitted. In addition, in FIG. 12B, mesh 131 (first rib 137 and second rib 138) is shaded.

As illustrated in FIGS. 12A to 12C, mesh filter 430b according to Modification 7 includes the plurality of second protrusions 431a at the inner peripheral surface of rim 133 and the plurality of protrusions 331 at final charging part 134. In the present embodiment, three second protrusions 431a and three protrusions 331 are provided. Mesh filter 430b of the present modification can prevent lyophilized material 132 from being separated from mesh 131 more than mesh filter 330a according to Modification 3 and mesh filter 430a according to Modification 6.

Figure 13A:
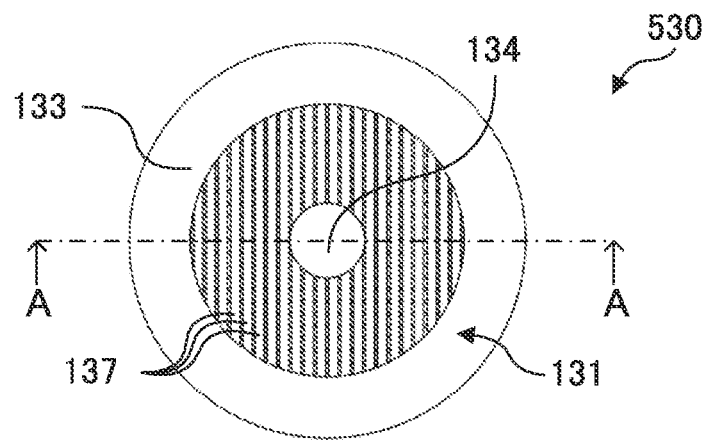
FIGS. 13A to 13C are diagrams illustrating a configuration of a mesh filter according to Modification 8.
Figure 13B:
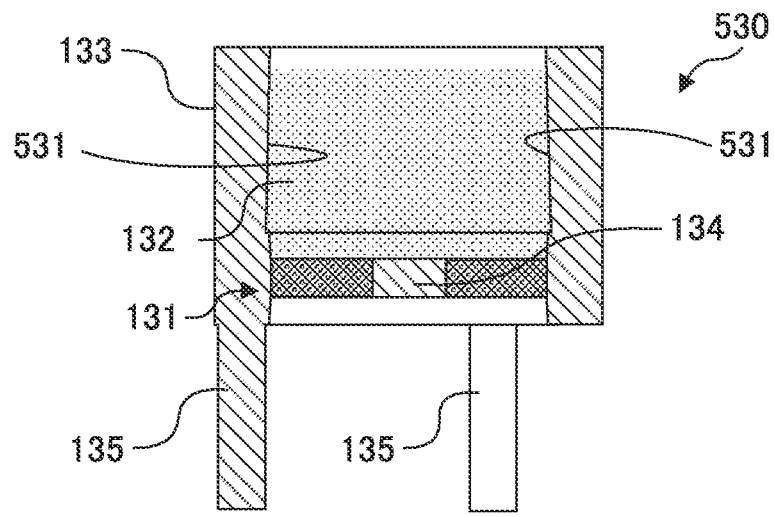
Figure 13C:
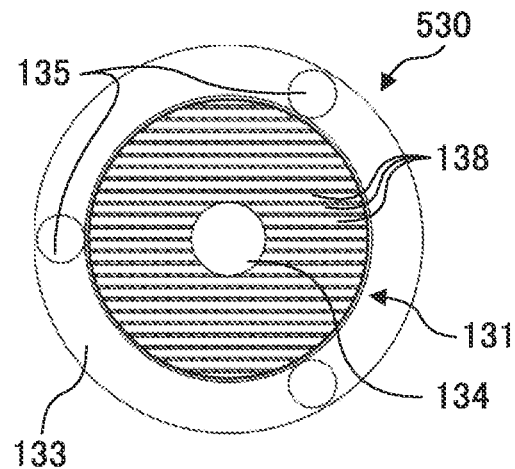

FIGS. 13A to 13C are diagrams illustrating a configuration of mesh filter 530 according to Modification 8. FIG. 13A is a plan view of mesh filter 530 according to Modification 8, FIG. 13B is a sectional view taken along line A-A of FIG. 13A, and FIG. 13C is a bottom view. In FIG. 13A, lyophilized material 132 is omitted. In addition, in FIG. 13B, mesh 131 (first rib 137 and second rib 138) is shaded.

As illustrated in FIGS. 13A to 13C, mesh filter 530 according to Modification 8 may be tilted such that it comes closer to final charging part 134 (the central axis of rim 133) side (in the retaining direction) as the distance of inner peripheral surface 531 of rim 133 from mesh 131 increases in the direction along rotation axis RA (the vertical direction in the drawing). The inclination angle with respect to rotation axis RA in the cross section including rotation axis RA is not limited. The inclination angle is 0.1 to 30 degrees. In the present embodiment, the inclination angle is approximately 2 degrees.

Modifications 9 and 10

Next, fluid handling devices according to Modifications 9 and 10 are described. The fluid handling devices according to Modifications 9 and 10 are different from fluid handling device 100 according to Embodiment 1 only in configuration of the housing part and the mesh filter. In view of this, only the configurations of the housing part and the mesh filter are described. In addition, the same components as those of housing part 120 and mesh filter 130 of Embodiment 1 are denoted with the same reference numerals and the description thereof will be omitted.

Figure 14A:
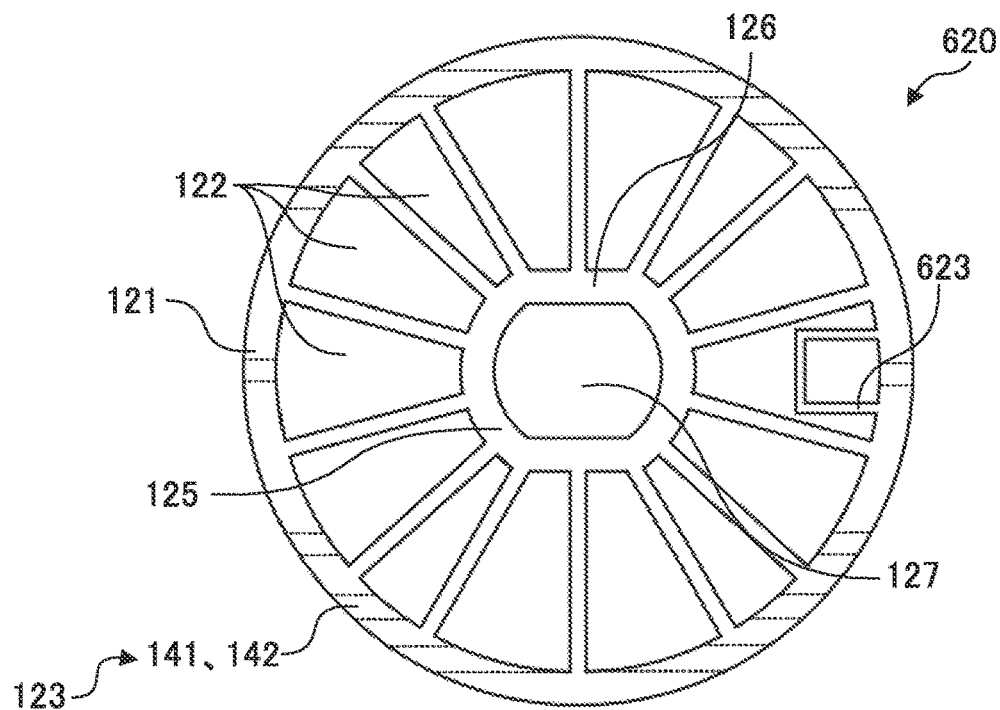
FIGS. 14A and 14B are diagrams illustrating a configuration of a housing part in a fluid handling device according to Modification 9.
Figure 14B:
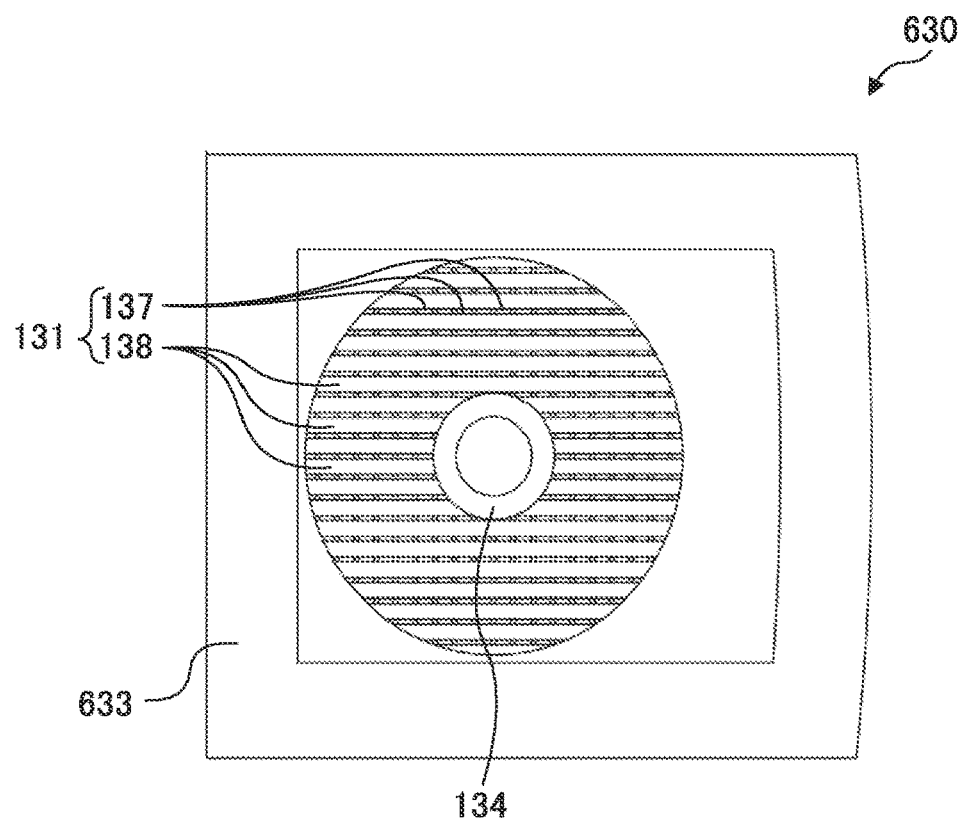

FIGS. 14A and 14B are diagrams illustrating configurations of housing part 620 and mesh filter 630 in the fluid handling device according to Modification 9. FIG. 14A is a plan view of housing part 620 in the fluid handling device according to Modification 9, and FIG. 14B is a plan view of mesh filter 630.

As illustrated in FIG. 14A, housing part 620 in Modification 9 includes side wall 121, the plurality of chambers 122 and 623, and the plurality of communication holes 123. In the present modification, chamber 623 directly fixes mesh filter 630. In addition, in the present modification, in the cross-section along the direction orthogonal to rotation axis RA, the shape of the inner peripheral surface of chamber 623 is a substantially rectangular shape that is equal to the outer shape of mesh filter 630 or slightly smaller than the outer shape. In the present modification, mesh filter 630 is fixed to chamber 623 through press-fitting or the like. In this manner, mesh filter 630 can be fixed even without the fixing part.

As illustrated in FIG. 14B, mesh filter 630 according to Modification 9 includes mesh 131, lyophilized material 132, rim 633, final charging part 134, and a leg part (omitted in the drawing). Rim 633 is disposed to surround mesh 131, and is formed with a substantially rectangular outer shape. The outer shape of rim 633 is complementary to the inner shape of chamber 623, and is slightly larger than the inner shape of chamber 623.

Figure 15A:
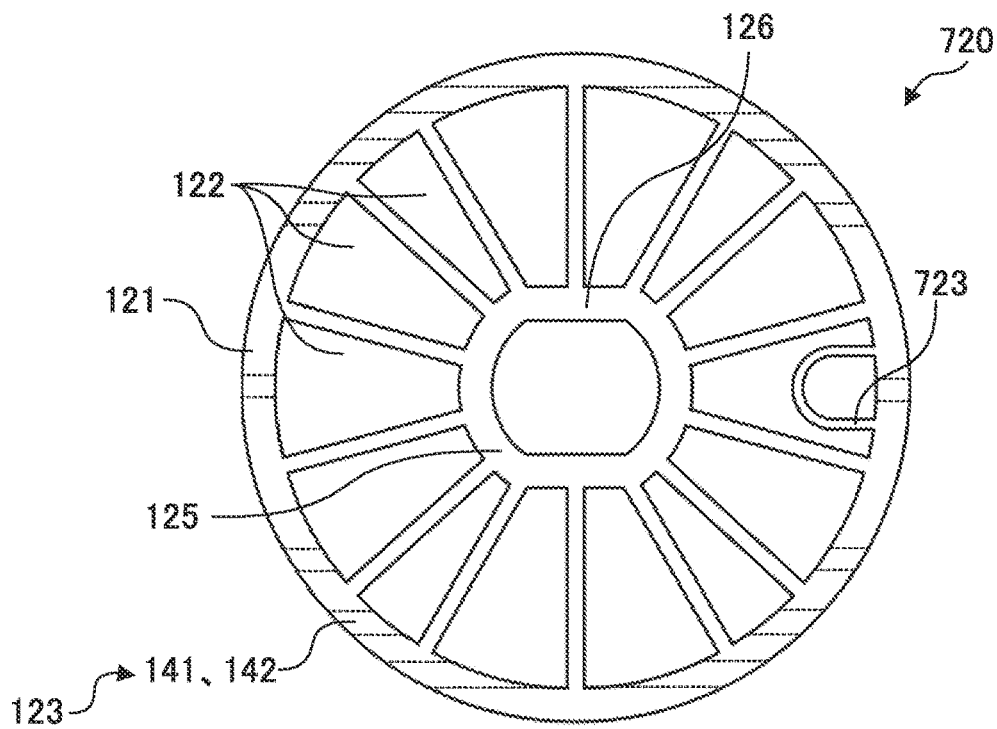
FIGS. 15A and 15B are diagrams illustrating a configuration of a housing part in a fluid handling device according to Modification 10.
Figure 15B:
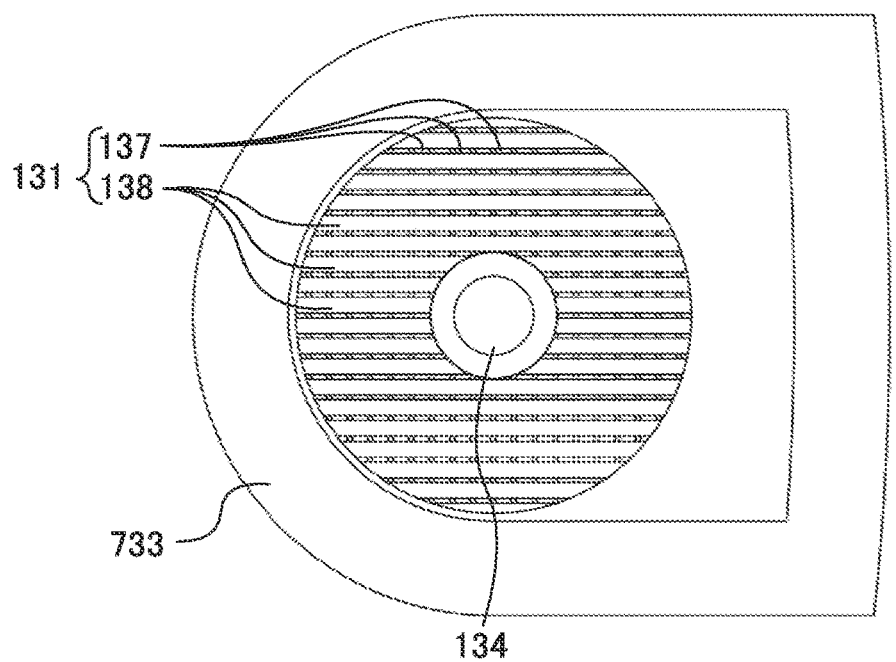

FIGS. 15A and 15B are diagrams illustrating configurations of housing part 720 and mesh filter 730 of the fluid handling device according to Modification 10. FIG. 15A is a plan view of housing part 720 in the fluid handling device according to Modification 10, and FIG. 15B is a plan view of mesh filter 730.

As illustrated in FIG. 15A, housing part 720 in Modification 10 includes side wall 121, the plurality of chambers 122 and 723, and the plurality of communication holes 123. In the present modification, chamber 723 directly fixes mesh filter 730. In addition, in the present modification, the shape of the inner peripheral surface of chamber 723 in the cross-section along the direction orthogonal to rotation axis RA is slightly smaller than the outer shape of mesh filter 730. In addition, in the present modification, the shape of the inner peripheral surface of chamber 723 in that cross-section is a bell shape. In the present modification, mesh filter 730 is fixed to chamber 723 by press-fitting or the like. In this manner, mesh filter 730 can be fixed even without the fixing part.

As illustrated in FIG. 15B, mesh filter 730 according to Modification 10 includes mesh 131, lyophilized material 132, rim 733, final charging part 134, and a leg part (omitted in the drawing). Rim 733 is disposed to surround mesh 131, and is formed in a bell-like outer shape. The outer shape of rim 733 is complementary to the inner shape of chamber 723, and is slightly larger than the inner shape of chamber 723.

Embodiment 2

Next, fluid handling device 800 according to Embodiment 2 is described. Fluid handling device 800 according to the present embodiment is different from fluid handling device 100 according to Embodiment 1 in configurations of housing part 820 and mesh filter 830. In view of this, the components same as those of fluid handling device 100 according to Embodiment 1 are denoted with the same reference numerals and the description thereof will be omitted.

Figure 16A:
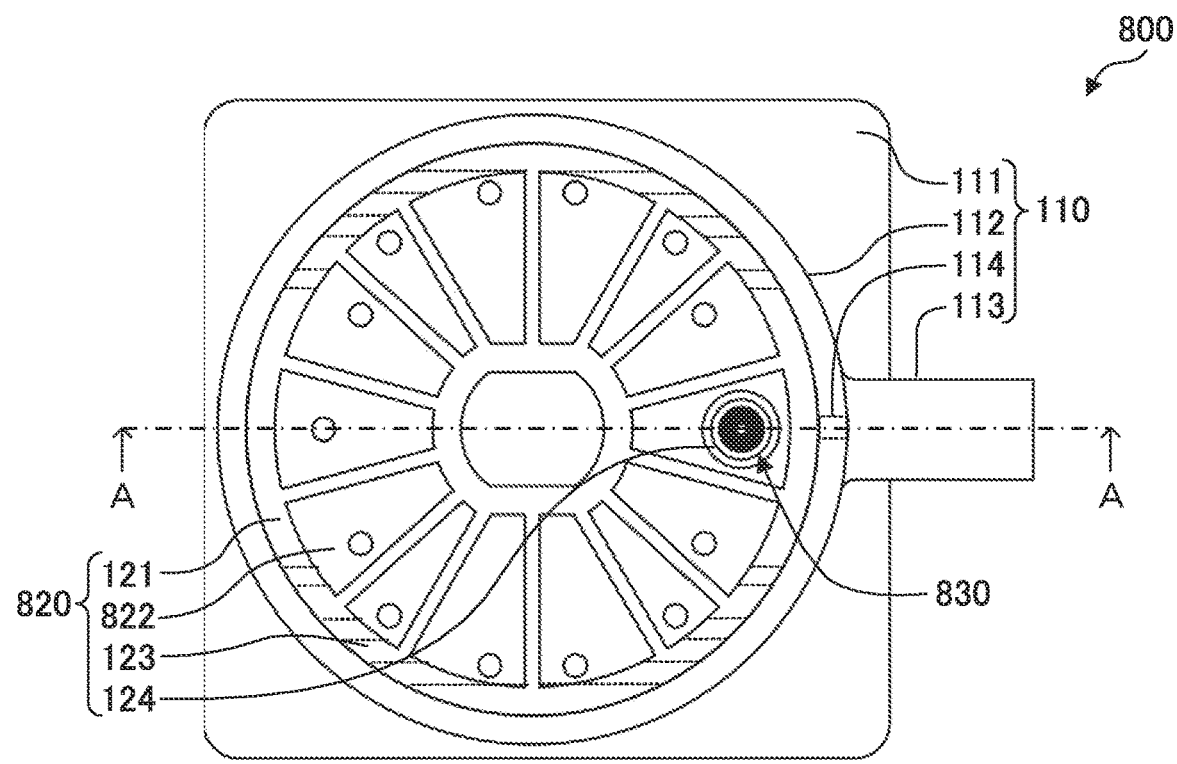
FIGS. 16A and 16B are diagrams illustrating a configuration of a fluid handling device according to Embodiment 2.
Figure 16B:
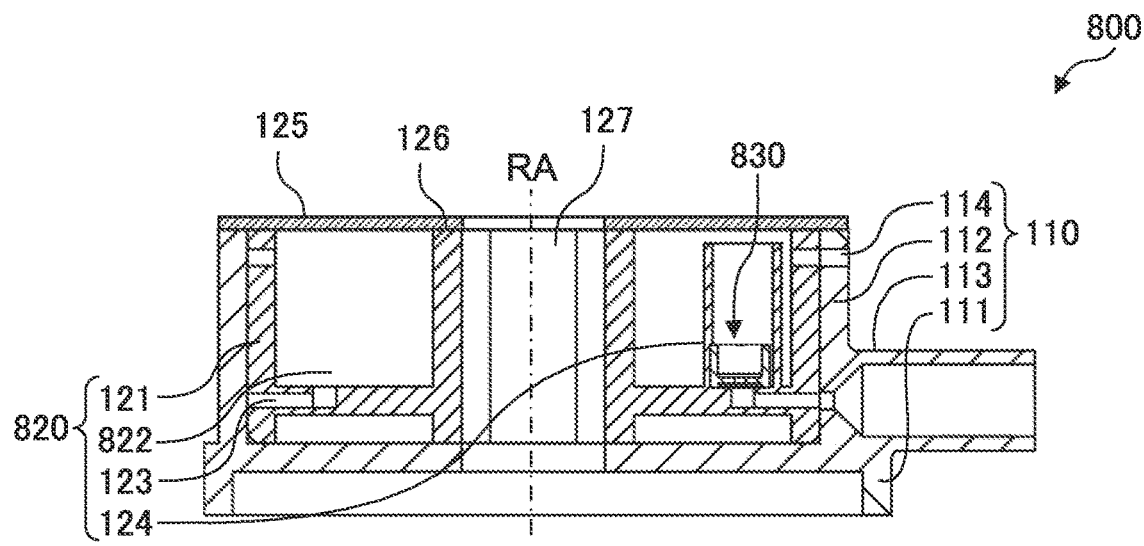

FIGS. 16A and 16B are diagrams illustrating a configuration of fluid handling device 800. FIG. 16A is a plan view of fluid handling device 800, and FIG. 16B is a sectional view taken along line A-A of FIG. 16A.

As illustrated in FIG. 16A and FIG. 16B, fluid handling device 800 includes case 110, housing part 820, and mesh filter 830.

Figure 17A:
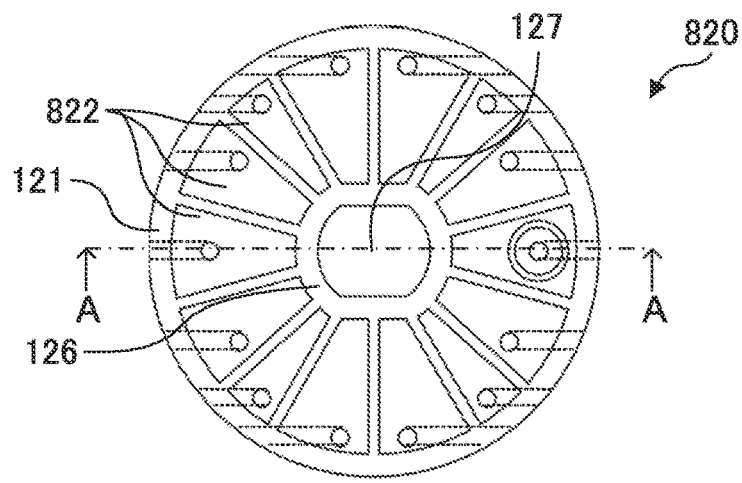
FIGS. 17A to 17C are diagrams illustrating a configuration of a housing part in the fluid handling device according to Embodiment 2.
Figure 17B:
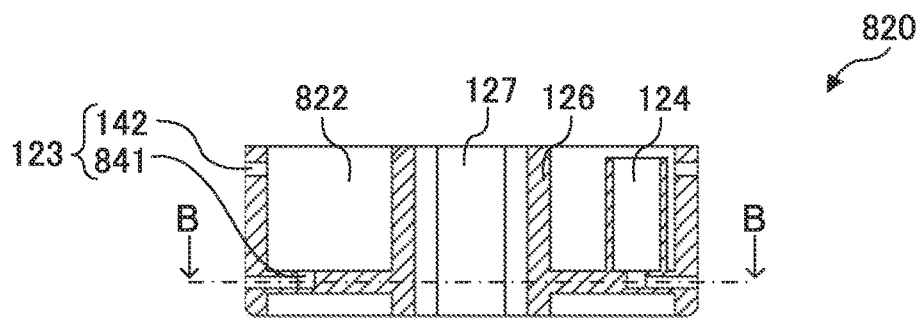
Figure 17C:
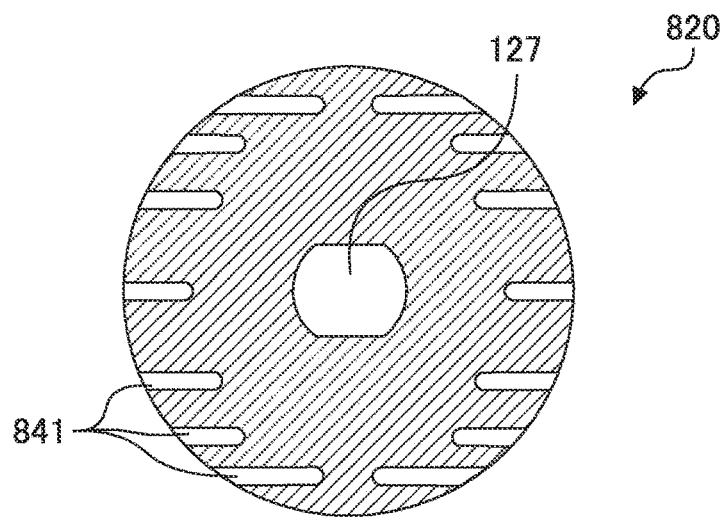

FIGS. 17A to 17C are diagrams illustrating a configuration of housing part 820. FIG. 17A is a plan view of housing part 820, FIG. 17B is a sectional view taken along line A-A of FIG. 17A, and FIG. 17C is a sectional view taken along line B-B of FIG. 17B.

As illustrated in FIGS. 17A to 17C, housing part 820 includes side wall 121, a plurality of chambers 822, the plurality of communication holes 123, and fixing part 124. First communication hole 841 formed in chamber 822 (side wall 121) opens at the bottom surface of chamber 822 and the outer peripheral surface of side wall 121. In addition, in the present embodiment, an air layer is disposed on the lower side of the bottom surface of chamber 822.

Figure 18A:
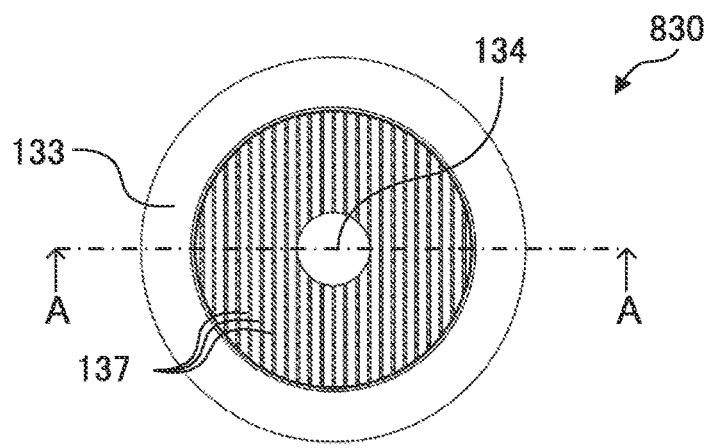
FIGS. 18A to 18C are diagrams illustrating a mesh filter in the fluid handling device according to Embodiment 2.
Figure 18B:
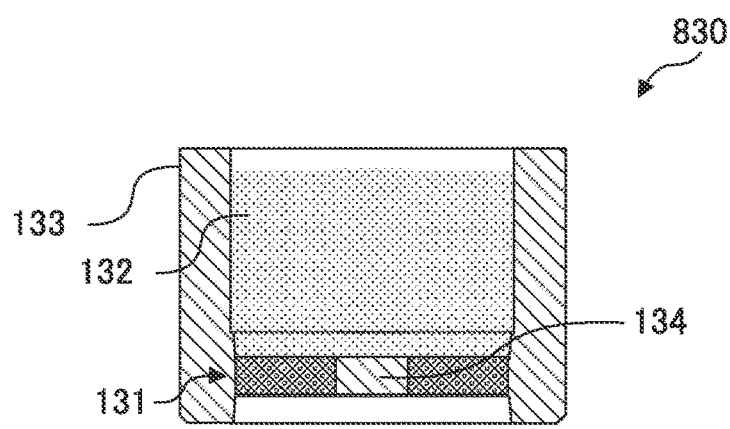
Figure 18C:
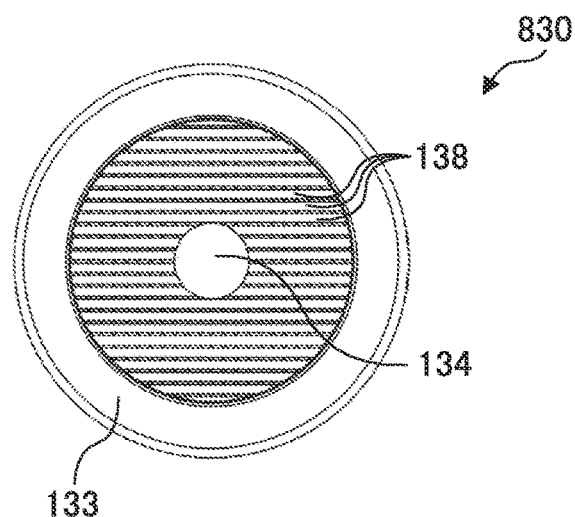

FIGS. 18A to 18C are diagrams illustrating a configuration of mesh filter 830. FIG. 18A is a plan view of mesh filter 830, FIG. 18B is a sectional view taken along line A-A of FIG. 18A, and FIG. 18C is a bottom view. In FIG. 18A, lyophilized material 132 is omitted. In addition, in FIG. 18B, mesh 131 (first rib 137 and second rib 138) is shaded.

Mesh filter 830 includes mesh 131, lyophilized material 132, rim 133, and final charging part 134. That is, mesh filter 830 in the present embodiment does not include leg part 135.

Effect

In this manner, the fluid handling device according to the present embodiment has an effect similar to that of the fluid handling device according to Embodiment 1.

This application is entitled to and claims the benefit of Japanese Patent Application No. 2020-016397 filed on Feb. 3, 2020, the disclosure each of which including the specification, drawings and abstract is incorporated herein by reference in its entirety.

INDUSTRIAL APPLICABILITY

The fluid handling device of the embodiment of the present invention is applicable to analysis of a small amount of biological sample or the like, for example.

REFERENCE SIGNS LIST 100, 800 Fluid handling device
110 Case
111 Base
112 Case body
113 Insertion part
114 Outer communication hole
115 Hole
120, 620, 720, 820 Housing part
121 Side wall
122, 623, 723, 822 Chamber
123 Communication hole
124 Fixing part
125 Lid part
126 Inner wall
127 Inner hole
130, 230, 330, 330a, 330b, 430, 430a, 430b, 530, 630, 730, 830 Mesh filter
131 Mesh
132 Lyophilized material
133, 633, 733 Rim
134 Final charging part
135 Leg part
136 Hole
137 First rib
138 Second rib
141, 841 First communication hole
142 Second communication hole
331 Protrusion
431 First protrusion
431a Second protrusion
531 Inner peripheral surface

The invention claimed is:

1. A fluid handling device comprising:
a case with a bottomed shape;
a housing part housed in the case, the housing part being rotatable around a rotation axis with an outer peripheral surface making contact with an inner peripheral surface of the case; and
a mesh filter configured to be detachable with respect to the housing part,
wherein the housing part includes:
a side wall formed in a substantially cylindrical shape,
a plurality of chambers formed inside the side wall, and
a plurality of communication holes configured to communicate between outside of the side wall and the plurality of chambers,
wherein the mesh filter includes:
a mesh; and
a lyophilized material of solution fixed to the mesh,
wherein the chamber where the mesh is disposed includes a fixing part configured to fix the mesh filter such that the mesh sections a space inside the chamber into an upper space and a lower space,
wherein in the chamber, the mesh filter is fixed by the fixing part such that the mesh is located on a bottom side of the chamber than the lyophilized material;
wherein the plurality of communication holes includes a first communication hole configured to supply liquid into the chamber where the mesh is disposed; and
wherein in the chamber, the first communication hole opens at a location on the bottom side of the chamber than the mesh.

2. The fluid handling device according to claim 1, wherein a mesh opening of the mesh is 500 μm or smaller.

3. The fluid handling device according to claim 1, wherein the mesh is made of resin; and
wherein a mesh opening of the mesh is 10 to 500 μm.

4. The fluid handling device according to claim 1, further comprising a rim formed to surround the mesh and connected to the mesh, wherein
the lyophilized material of solution is fixed to a front side or a rear side of the mesh.

5. The fluid handling device according to claim 4, wherein a height of the rim from the mesh is greater than a thickness of the lyophilized material of solution.

6. The fluid handling device according to claim 4, further comprising a plurality of protrusions disposed at an inner peripheral surface of the rim.

7. The fluid handling device according to claim, 4, further comprising a final charging part surrounded by the mesh, wherein the final charging part includes a protrusion protruding toward a front side of the rim.

* * * * *